United States Patent
Fujita et al.

(10) Patent No.: US 11,267,978 B2
(45) Date of Patent: Mar. 8, 2022

(54) REVERSIBLY THERMOCHROMIC AQUEOUS INK COMPOSITION AND WRITING INSTRUMENT USING THE SAME

(71) Applicants: KABUSHIKI KAISHA PILOT CORPORATION, Tokyo-to (JP); THE PILOT INK CO., LTD., Aichi-ken (JP)

(72) Inventors: Katsuyuki Fujita, Aichi-ken (JP); Yasuaki Kambe, Aichi-ken (JP); Masayuki Mita, Aichi-ken (JP); Tomoyuki Yamamura, Aichi-ken (JP)

(73) Assignees: KABUSHIKI KAISHA PILOT CORPORATION, Tokyo-To (JP); THE PILOT INK CO., LTD., Aichi-Ken (JP)

( * ) Notice: Subject to any disclaimer, the term of this patent is extended or adjusted under 35 U.S.C. 154(b) by 0 days.

(21) Appl. No.: 16/758,186

(22) PCT Filed: Oct. 16, 2018

(86) PCT No.: PCT/JP2018/038398
§ 371 (c)(1),
(2) Date: Apr. 22, 2020

(87) PCT Pub. No.: WO2019/082722
PCT Pub. Date: May 2, 2019

(65) Prior Publication Data
US 2020/0325351 A1 Oct. 15, 2020

(30) Foreign Application Priority Data

Oct. 23, 2017 (JP) .............................. JP2017-204286
Mar. 26, 2018 (JP) .............................. JP2018-057731

(51) Int. Cl.
*C09D 11/17* (2014.01)
*B43K 8/02* (2006.01)
(Continued)

(52) U.S. Cl.
CPC .............. *C09D 11/17* (2013.01); *B43K 8/026* (2013.01); *B43K 29/02* (2013.01); *C09D 11/50* (2013.01)

(58) Field of Classification Search
CPC ......... C09D 11/16; C09D 11/17; C09D 11/50; B43K 8/02; B43K 8/026; B43K 29/02
See application file for complete search history.

(56) References Cited

U.S. PATENT DOCUMENTS

| 4,421,560 A * | 12/1983 | Kito ....................... B41M 5/305 |
| | | 106/31.2 |
| 5,785,746 A * | 7/1998 | Kito ....................... C09D 11/18 |
| | | 106/31.86 |

(Continued)

FOREIGN PATENT DOCUMENTS

| CN | 101965386 | 2/2011 |
| CN | 102575123 | 7/2012 |

(Continued)

OTHER PUBLICATIONS

International Search Report (ISR) dated Dec. 25, 2018 in International (PCT) Application No. PCT/JP2018/038398.

(Continued)

*Primary Examiner* — J C Jacyna
(74) *Attorney, Agent, or Firm* — Wenderoth, Lind & Ponack, L.L.P.

(57) ABSTRACT

To provide a reversibly thermochromic aqueous ink composition excellent in dispersion stability of a reversibly thermochromic microcapsule pigment and a writing instrument using the same.

Disclosed is a reversibly thermochromic aqueous ink composition comprising a reversibly thermochromic microcapsule pigment encapsulating a reversibly thermochromic composition comprising (a) an electron-donating color-developing organic compound, (b) an electron-accepting com- (Continued)

pound, and (c) a reaction medium to determine an occurrence temperature of a coloring reaction of the component (a) and the component (b), and a vehicle comprising water and a specific gravity adjuster selected from the group consisting of an oxyacid belonging to Group 6 having an atomic weight of 90 to 185 or salt thereof.

15 Claims, 6 Drawing Sheets

(51) Int. Cl.
  *B43K 29/02* (2006.01)
  *C09D 11/50* (2014.01)

(56) References Cited

U.S. PATENT DOCUMENTS

| | | | |
|---|---|---|---|
| 2002/0063244 A1 | 5/2002 | Nakashima et al. | |
| 2007/0189836 A1* | 8/2007 | Senga | B43K 7/10 401/195 |
| 2008/0124164 A1* | 5/2008 | Ito | B43K 29/02 401/195 |
| 2012/0070584 A1* | 3/2012 | Wang | C09D 11/18 427/261 |
| 2012/0141188 A1* | 6/2012 | Fujita | B43K 8/02 401/261 |
| 2012/0316276 A1* | 12/2012 | Iwasa | C09D 11/17 524/388 |
| 2013/0029257 A1* | 1/2013 | Fujita | G03G 9/0926 430/105 |
| 2013/0305946 A1* | 11/2013 | Iftime | C09D 11/101 101/483 |
| 2013/0305947 A1* | 11/2013 | Iftime | C09D 11/101 101/483 |
| 2016/0032121 A1* | 2/2016 | Moore | C08G 18/0823 524/497 |
| 2017/0088737 A1* | 3/2017 | Nakashima | C09D 11/023 |
| 2018/0016459 A1* | 1/2018 | Okada | C09D 17/00 |
| 2018/0223120 A1 | 8/2018 | Ono | |
| 2019/0367755 A1* | 12/2019 | Ohno | C09D 11/17 |

FOREIGN PATENT DOCUMENTS

| | | | | |
|---|---|---|---|---|
| CN | 102713762 | 10/2012 | | |
| EP | 3 135 738 | 3/2017 | | |
| JP | 51-44706 | 11/1976 | | |
| JP | 51-44707 | 11/1976 | | |
| JP | 1-29398 | 6/1989 | | |
| JP | 4-17154 | 3/1992 | | |
| JP | 7-33997 | 2/1995 | | |
| JP | 7-145339 | 6/1995 | | |
| JP | 7-179777 | 7/1995 | | |
| JP | 8-39936 | 2/1996 | | |
| JP | 11-5973 | 1/1999 | | |
| JP | 11-129623 | 5/1999 | | |
| JP | 2978798 | 9/1999 | | |
| JP | 11-335613 | 12/1999 | | |
| JP | 2001-105732 | 4/2001 | | |
| JP | 2001-294795 | 10/2001 | | |
| JP | 2003-171593 | 6/2003 | | |
| JP | 2003-221541 | 8/2003 | | |
| JP | 2003221541 | * | 8/2003 | A61F 13/1559 |
| JP | 2003-253149 | 9/2003 | | |
| JP | 2003-253171 | 9/2003 | | |
| JP | 2006-117805 | 5/2006 | | |
| JP | 2006-152186 | 6/2006 | | |
| JP | 2007-224295 | 9/2007 | | |
| JP | 2010-59256 | 3/2010 | | |
| JP | 2015-10124 | 1/2015 | | |
| JP | 2016-124930 | 7/2016 | | |
| WO | 2017/022471 | 9/2017 | | |

OTHER PUBLICATIONS

Written Opinion dated May 7, 2020 in International (PCT) Application No. PCT/JP2018/038398.
Extended European Search Report dated Jul. 2, 2021 in corresponding European Patent Application No. 18871394.5.
Office Action dated Oct. 26, 2021 in corresponding Chinese Patent Application No. 201880068903.X, with English-language translation.

* cited by examiner

[FIG. 1]
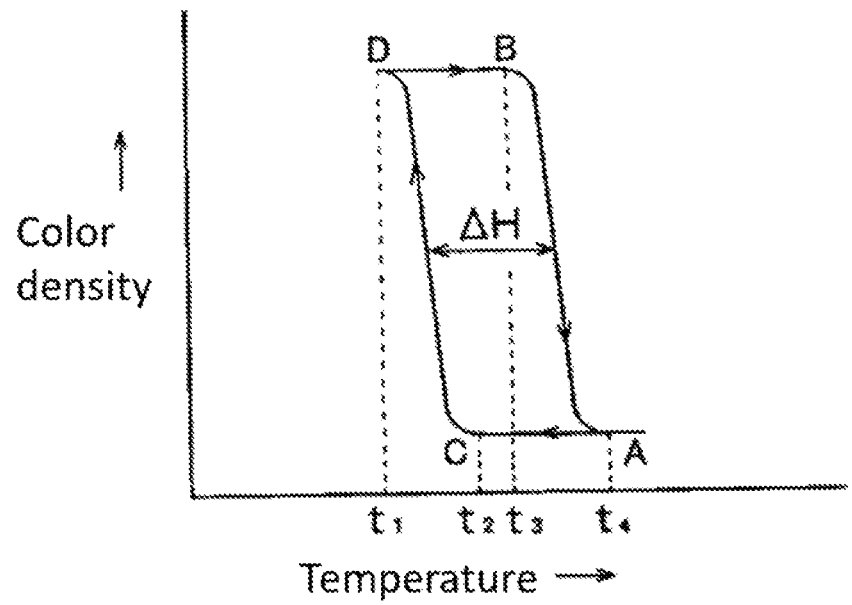
[FIG. 2]
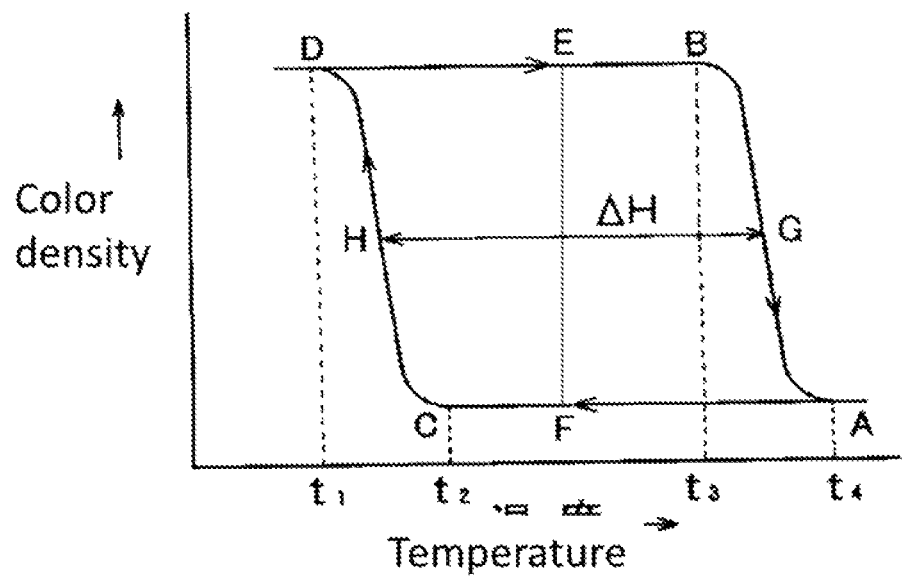

[FIG. 3]
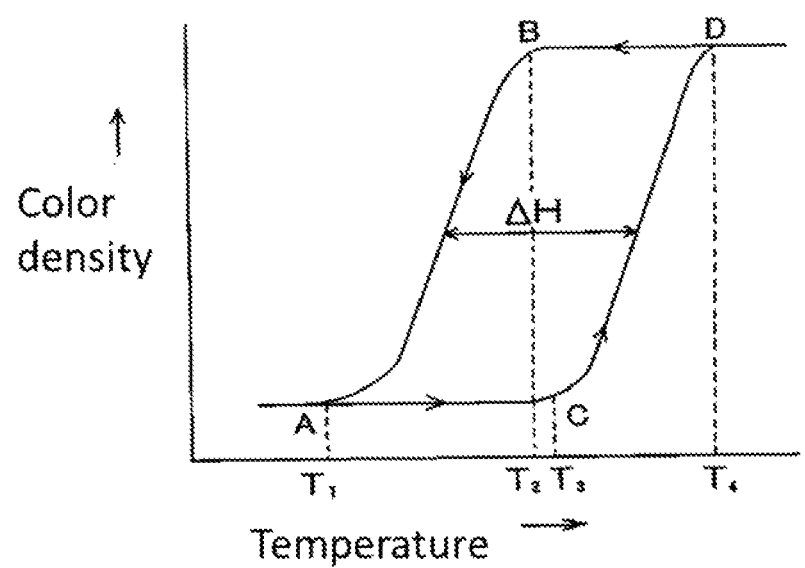

[FIG. 4]
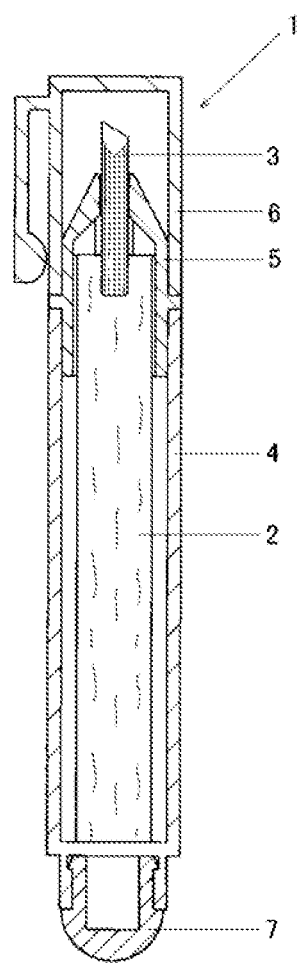

[FIG. 5]
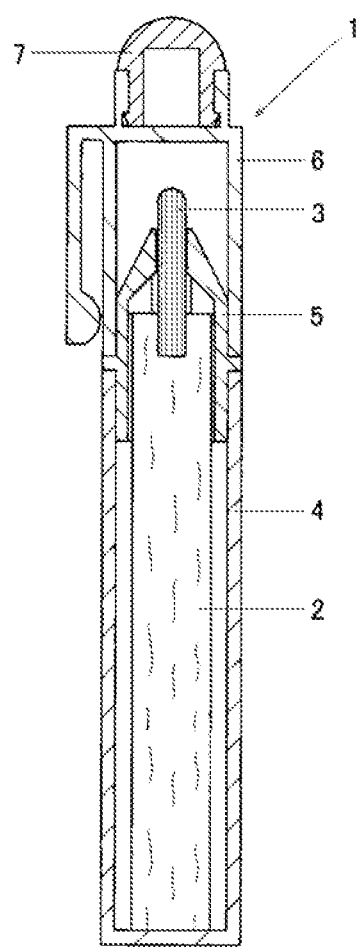

[FIG. 6]
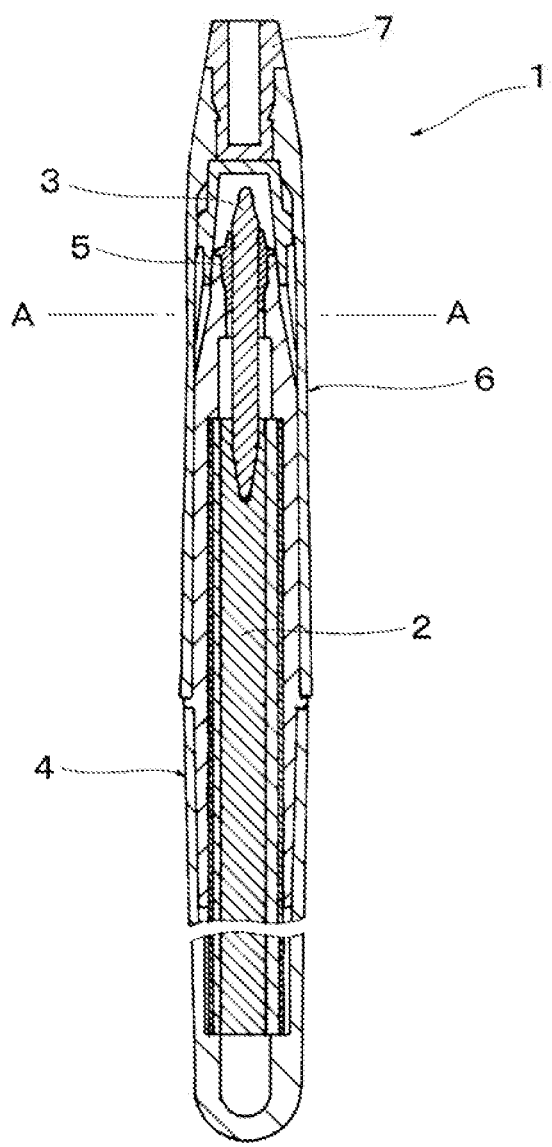

[FIG. 7]
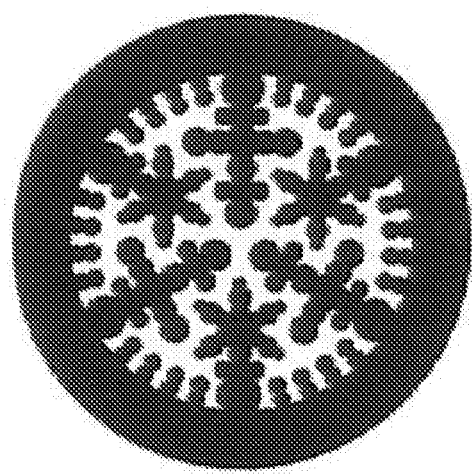

REVERSIBLY THERMOCHROMIC AQUEOUS INK COMPOSITION AND WRITING INSTRUMENT USING THE SAME

TECHNICAL FIELD

The present invention relates, to a reversibly thermochromic aqueous ink composition. More specifically, the present invention relates to a reversibly thermochromic aqueous ink composition having excellent storage stability and color development of ink. The present invention also relates to a writing instrument using the composition.

BACKGROUND ART

Conventionally, ink compositions for writing instruments using a pigment as a colorant have been actively studied because a color tone with excellent vividness can be obtained, and in particular, an ink composition using a reversibly thermochromic microcapsule pigment can achieve different colors depending on temperature and is therefore applied to various writing instruments (for example, Patent Literature 1).

Patent Literature 1 describes an ink composition for a writing instrument using a reversibly thermochromic microcapsule pigment and a vehicle composed of water, a polymeric coagulant, a dispersant, and the like, and a writing instrument using the same. This ink suppresses non-uniformity of concentration of the reversibly thermochromic microcapsule pigment in the ink over the time, and improves the density of handwriting and color development.

However, in the ink composition described in Patent Literature 1, depending on the form of a writing instrument containing the ink composition, when an external stimulus such as vibration is applied, the reversibly thermochromic microcapsule pigment sinks and floats, so that in some cases, the concentration of the reversibly thermochromic microcapsule pigment becomes nonuniform in the ink.

On the other hand, there is also known a method in which a thickener is added so that the ink has a high viscosity at the time of still standing, thereby suppressing the sinking and floating of the pigment in the ink (for example, Patent Literature 2 to 4).

Patent Literature 2 describes an aluminum pigment ink composition using a natural polysaccharide for thickening. In this ink, sedimentation of aluminum during long-term storage is suppressed.

Patent Literature 3 discloses an aluminum pigment ink composition using a crosslinker acrylic acid polymer having a molecular weight of 3,000,000 to 5,000,000. Also in this ink, sedimentation of aluminum during long-term storage is suppressed.

Patent Literature 4 discloses a luster pigment ink composition using an aqueous resin such as a polysaccharide, polyvinyl alcohol, or polyvinylpyrrolidone for a viscosity modifier. Also in this ink, sedimentation of the pigment during long-term storage is suppressed.

As described above, the prior art in which an ink composition is obtained by combining a pigment and a thickener has succeeded in suppressing the sedimentation of the pigment in the ink to some extent. These inks maintain a high viscosity in a stationary state and suppress the sedimentation of the pigment, and also reduce the viscosity when a shear force is applied, thereby simultaneously realizing suppression of the sedimentation of the pigment and good ink ejection properties from an end of a ballpoint pen tip. However, the viscosity of such an ink composition is likely to be reduced when vibration is applied from the outside; therefore, when a pigment having a large specific gravity is used, the pigment is liable to sink, and the viscosity is not reduced when no external force is applied; therefore, when the ink composition is used in a writing instrument such as a marking pen or a felt-tip pen that ejects ink by capillary force, the ink ejection property may be reduced, and improvement has been desired

CITATION LIST

Patent Literature

Patent Literature 1: JP 11-335613A
Patent Literature 2: JP 7-145339A
Patent Literature 3: JP 2978798B
Patent Literature 4: JP 2001-294795A

SUMMARY OF INVENTION

Technical Problem

An object of the present invention is to provide reversibly thermochromic aqueous ink composition, which can prevent a reversibly thermochromic microcapsule pigment from sinking, floating and localizing in the ink composition even when a stimulus such as vibration is applied from the outside, and a writing instrument using the same.

Solution to Problem

A reversibly thermochromic aqueous ink composition according to the present invention comprises a reversibly thermochromic microcapsule pigment encapsulating a reversibly thermochromic composition comprising (a) an electron-donating color-developing organic compound, (b) an electron-accepting compound, and (c) a reaction medium to determine an occurrence temperature of a coloring reaction of the component (a) and the component (b), and a vehicle comprising water and a specific gravity adjuster selected from the group consisting of an oxyacid belonging to Group 6 having an atomic weight of 90 to 185 and salt thereof.

A writing instrument according to the present invention stores the reversibly thermochromic aqueous ink composition described above.

Advantageous Effects of Invention

The present invention provides the reversibly thermochromic aqueous ink composition, which prevents the reversibly thermochromic microcapsule from sinking and floating in the ink composition when stimulation such as vibration is applied from the outside and provides excellent dispersion stability, and a writing instrument using the reversibly thermochromic aqueous ink composition capable of forming good handwriting having excellent handwriting color development without a variable-density difference.

BRIEF DESCRIPTION OF DRAWINGS

FIG. 1 is an explanatory view showing a discoloration behavior of a microcapsule pigment encapsulating a reversibly thermochromic composition of heat-decoloring type.

FIG. 2 is an explanatory view showing the discoloration behavior of a microcapsule pigment encapsulating the reversibly thermochromic composition of heat-decoloring type having a color-memory property.

FIG. 3 is an explanatory view showing the discoloration behavior of a microcapsule pigment encapsulating a reversibly thermochromic composition of heat color-developing type.

FIG. 4 is an explanatory view showing one embodiment of the present invention.

FIG. 5 is an explanatory view showing another embodiment of a writing instrument of the present invention.

FIG. 6 is an explanatory view showing another embodiment of the writing instrument of the present invention.

FIG. 7 is a cross-sectional view taken along line A-A of a pen body mounted on the writing instrument of FIG. 6.

DESCRIPTION OF EMBODIMENTS

An embodiment of the present invention will be described in detail below. As used herein, the terms "part(s)", "%", "ratio", and the like with respect to compounding are on a mass basis, unless particularly noted.

A reversibly thermochromic aqueous ink composition (hereinafter, in some cases, may be referred to as "ink composition") according to the present invention comprises a reversibly thermochromic microcapsule pigment, and a vehicle comprising water and a specific gravity adjuster selected from the group consisting of an oxyacid belonging to Group 6 having an atomic weight of 90 to 185 or salt thereof.

Hereinafter, each component constituting the ink composition according to the present invention will be described.

(Reversibly Thermochromic Microcapsule Pigment)

A colorant used in the present invention is a reversibly thermochromic microcapsule pigment (hereinafter, in some cases, may be referred to as "microcapsule pigment") which contains essential three components of (a) an electron-donating color-developing organic compound; (b) an electron-accepting compound; and (c) a reaction medium to determine an occurrence temperature of a coloring reaction of the component (a) and the component (b) and in which a reversibly thermochromic composition decolored when heated is encapsulated in a microcapsule.

As a microcapsule pigment, it is possible to apply a microcapsule pigment described in JP S51-44706B, JP S51-44707B, JP H1-29398B, etc. and encapsulating a reversibly thermochromic composition of heat-decoloring type (decolored when heated, and colored when cooled) which changes color above and below a predetermined temperature (color changing point), exhibits a decolored state in a temperature range not lower than an upper color changing point, exhibits a colored state in a temperature range not higher than a lower color changing point, and has characteristics in which only one specific state, of the both states, exists in a normal temperature range, and the other state is maintained only while heat or cold required for the other state to be expressed is being applied, but the state in the normal temperature range is restored once the application of heat or cold is terminated and in which a hysteresis width is relatively small (ΔH=1 to 7° C.) (see FIG. 1).

Also, it is possible to apply a microcapsule pigment encapsulating a reversibly thermochromic composition described in JP H4-17154B, JP H7-179777A, JP H7-33997A, JP H8-39936, etc. and exhibiting a characteristic of large hysteresis (ΔHB=8 to 50° C.), that is, a reversibly thermochromic composition of heat-decoloring type (decolored when heated, and colored when cooled) which changes the color along very different paths in the curve of plots showing color density change with temperature change between when the temperature increases from a region lower than the discoloration range and when the temperature decreases from a region higher than the discoloration range and has color memorability in the specific temperature range (range between t2 and t3 [essentially two-phase retaining temperature range]), in which the color state depends on the color-developed state in a range lower than the completely coloring temperature (t1) or on the decolored state in a range higher than the completely decoloring temperature (t4)(see FIG. 2).

Hysteresis characteristics of a reversibly thermochromic composition in a color density-temperature curve will be described.

In FIG. 2, the color density is plotted on the ordinate and the temperature is plotted on the abscissa. A change in the color density due to temperature change proceeds along the arrow. Here, A is a point showing the density at a temperature t4 at which a completely decolored state is achieved (hereinafter referred to as complete decoloring temperature); B is a point showing the density at a temperature t3 at which decoloring starts (hereinafter referred to as decoloring starting temperature); C is a point showing the density at a temperature t2 at which coloring starts (hereinafter referred to as coloring starting temperature); and ID is a point showing the density at a temperature t1 at which a completely colored state is achieved (hereinafter referred to as complete coloring temperature).

The discoloration temperature range is a temperature range between t1 and t4 where a colored state or a decolored state can be provided, and a temperature range between t2 and t3 where difference in color density is large is an essentially two-phase retaining temperature range.

Also, the length of the line segment EF is a measure showing contrast of discoloration, and the length of the line segment HG passing through the midpoint of the line segment EF is a temperature width showing the degree of hysteresis (hereinafter referred to as hysteresis width and represented by ΔH). When this ΔH value is small, only specified state of both states before and after discoloration can exist in the ordinary temperature region. When the ΔH value is large, it is easy to keep each state before and after discoloration.

As the reversibly thermochromic composition having a color-memory property, specifically, it can be effectively functioned for the retention of color shown at an ordinary state (daily life temperature region) by specifying the complete coloring temperature t1 to a temperature obtained only in a freezer, a cold district, and the like, i.e., a range of 50 to 0° C., preferably −40 to −5° C., more preferably −30 to −10° C. and the complete decoloring temperature t4 to a temperature obtained from frictional heat generated with a frictional body or a familiar heating body such as a hair dryer, i.e., a range of 45 to 95° C., preferably 50 to 90° C., more preferably 60 to 80° C. and specifying the ΔH value to 40 to 100° C.

Specific compounds to be used as the respective components (a), (b), and (c) will be exemplified below.

The component (a) of the present invention, namely, an electron-donating color-developing organic compound, is a color-determining component which develops a color by donating an electron(s) to the component (b), which is a color developer.

Examples of the electron-donating color-developing organic compound include phthalide compounds, fluoran compounds, styrynoquinoline compounds, diazarhodamine lactone compounds, pyridine compounds, quinazoline compounds, and bisquinazoline compounds, among which phthalide compounds and fluoran compounds are preferred.

Examples of the phthalide compounds include diphenylmethane phthalide compounds, phenylindolyl phthalide compounds, indolyl phthalide compounds, diphenylmethane azaphthalide compounds, phenylindolyl azaphthalide compounds, and derivatives of these compounds, among which phenylindolyl azaphthalide compounds and their derivatives are preferred.

Examples of the fluoran compounds include aminofluoran compounds, alkoxyfluoran compounds, and derivatives of these compounds.

Examples of these compounds are shown below.

There may be mentioned 3,3-bis(p-dimethylaminophenyl-6-dimetrylaminophthalide,
3-(4-diethylaminophenyl)-3-(1-ethyl-2-methylindol-3-yl) phthalide,
3,3-bis(1-n-butyl-2-methylindol-3-yl)phthalide,
3,3-bis(2-ethoxy-4-diethylaminophenyl)-4-azaphthalide
3-(2-ethoxy-4-diethylaminophenyl)-3-(1-ethyl-2-methylindol-3-yl)-4-azaphthalide,
3-(2-hexyloxy-4-diethylaminophenyl)-3-(1-ethyl-2-methylindol-3-yl)-4-azaphthalide,
3-[2-ethoxy-4-(N-ethylanilino)phenyl]-3-ethyl-2-methylindol-3-yl)-4-azaphthalide,
3-(2-acetamido-4-diethylaminophenyl)-1-propylindol-3-yl)-4-azaphthalide,
3,6-bis(diphenylamino)fluoran,
3,6-dimethoxyfluoran,
3,6-di-n-butoxyfluoran,
2-methyl-6-(N-ethyl-N-p-tolylamino)fluoran,
3-chloro-6-cyclohexylaminofluoran,
2-methyl-6-cyclohexylaminofluoran,
2-(2-chloroamino)-6-dibutylaminofluoran,
2-(2-chloroanilino)-6-di-n-butylaminofluoran,
2-(3-trifluoromethylanilino)-6-dethylaminofluoran,
2-(3-trifluoromethylanilino)-6-dipentylaminofluoran,
2-(dibenzylamino)-6-diethylaminofluoran,
2-(N-methylanilino)-6-(N-ethyl-N-p-tolylamino)fluoran,
1,3-dimethyl-6-diethylaminofluoran,
2-chloro-3-methyl-6-diethylaminofluoran,
2-aniline-3-methyl-6-diethylaminofluoran,
2-anilino-3-methoxy-6-diethylaminofluoran,
2-anilino-3-methyl-6-di-n-butylaminofluoran,
2-anilino-3-methoxy-6-di-n-butylaminofluoran,
2-xyridino-3-methyl-6-diethylaminofluoran,
2-aniline-3-methyl-6-(N-ethyl-N-p-tolylamino)fluoran,
1,2-benz-6-diethylaminofluoran,
1,2-benz-6-(N-ethyl-N-isobutylamino)fluoran,
1,2-bent-6-(N-ethyl-N-isoamylamino)fluoran,
2-(3-methoxy-4-dodecoxystyryl)quinoline,
spiro[5H-(1)benzopyrano(2,3-d)pyrimidine-5,1'(3'H)-isobenzofuran]-3'-one, 2-(diethylamino)-8-(diethylamino)-4-methyl,
spiro[5H-(1)benzopyrano(2,3-d)pyrimidine-5,1'(3'H)-isobenzofuran]-3'-one, 2-(di-n-butylamino)-8-(di-n-butylamino)-4-methyl,
spiro[5H-(1)benzopyrano(2,3-d)pyrimidine-5,1'(3'H)-isobenzofuran]-3'-one, 2-(di-n-butylamino)-8-(diethylamino)-4-methyl,
spiro[5H-(1)benzopyrano(2,3-d)pyrimidine-5,1'(3'H)-isobenzofuran]-3'-one, 2-(di-n-butylamino)-8-(N-ethyl-N-i-amylamino)-4-methyl,
spiro[5H-(1)benzopyrano(2,3-d)pyrimidine-5,1'(3'H)-isobenzofuran]-3'-one, 2-(diethylamino)-8-(dipentylamino)-4-methyl,
4,5,6,7-tetrachloro-3-[4-(dimethylamino)-2-methoxyphenyl]-3-(1-butyl-2-methyl-1H-indol-3-yl)-1(isobenzofuranone,
4,5,6,7-tetrachloro-3-[4-(diethylamino)-2-ethoxyphenyl]-3-(1-ethyl-2-methyl-1H-indol-3-yl)-1(3H)-isobenzofuranone,
4,5,6,7-tetrachloro-3-[4-(diethylamino)-2-ethoxyphenyl]-3-(1-pentyl-2-methyl-1H-indol-3-yl)-1(3H)-isobenzofuranone,
4,5,6,7-tetrachloro-3-[4-(diethylamino)-2-methylphenyl]-(1-ethyl-2-methyl-1H-indol-3-yl)-1(3H)-isobenzofuranone,
3',6'-bis[phenyl(2-methylphenyl)amino]-spiro[isobenzofuran-1(3H),9'-[9H]xanthen]-3-one,
3',6'-bis[phenyl(3-methylphenyl)amino]-spiro[isobenzofuran-1(3H),9'-[9H]xanthen]-3-one,
3,6'-bis[phenyl(3-ethylphenyl)amino]-spiro[isobenzofuran-1(3H),9'-[9H]xanthen]-3-one,
2,6-bis(2'-ethyloxyphenyl)-4-(4'-dimethylaminophenyl) pyridine,
2,6-bis(2',4'-diethyloxyphenyl)-4-(4'-dimethylaminophenyl) pyridine,
2-(4'-dimethylaminophenyl)-4-methoxy-quinazoline, and
4,4'-(ethylenedioxy)-bis[2-(4-diethylaminophenyl)quinazoline].

The fluorans may be compounds which contain a substituent in a xanthene ring-forming phenyl group, and in addition, may also be compounds which have a blue or black color and which contain a substituent in a xanthene ring-forming phenyl group as well as in a lactone ring-forming phenyl group (these substituents may be, for example, an alkyl group such as a methyl group or a halogen atom such as a chloro group).

The component (b) of the present invention, namely an electron-accepting compound, is a compound which receives an electron(s) from the component (a) and functions as a color developer of the component (a).

Examples of the electron-accepting compound include active proton-containing compounds and derivatives thereof; pseudo-acidic compounds (compounds which are not adds but each act as an add in an ink composition to cause the component (a) to develop a color); and compounds with electron vacancies. Among these, the component (b) is preferably a compound selected from active proton-containing compounds.

Examples of the active proton-containing compounds and derivatives thereof include phenolic hydroxyl group-containing compounds and metal salts thereof; carboxylic acids and metal salts thereof, preferably aromatic carboxylic acids, aliphatic carboxylic acids having 2 to 5 carbon atoms, and metal salts thereof; acidic phosphoric acid esters and metal salts thereof; as well as azole-based compounds and derivatives thereof, and 1,2,3-triazole and derivatives thereof. Among these, phenolic hydroxyl group-containing compounds are preferred since they can allow an effective discoloration characteristic to be expressed.

The phenolic hydroxyl group-containing compounds include a wide range of compounds, ranging from monophenol compounds to polyphenol compounds, and bis-type and tris-type phenols, phenol-aldehyde condensation resins and the like are also included therein. Among the phenolic hydroxyl group-containing compounds, those which contain at least two benzene rings are preferred. Further, these compounds may also have a substituent, examples of which include an alkyl group, an aryl group, an acyl group, an alkoxycarbonyl group, a carboxy group and an ester thereof, as well as an amide group and a halogen group.

Examples of the metal contained in the metal salts of the active proton-containing compounds include sodium, potassium, calcium, zinc, zirconium, aluminum, magnesium, nickel, cobalt, tin, copper, iron, vanadium, titanium, lead, and molybdenum.

Specific examples are described below.

phenol, o-cresol, tert-butyl catechol, nonylphenol, n-octylphenol, n-dodecylphenol, n-stearylphenol, o-chlorophenol, p-bromophenol, o-phenylphenol, n-butyl p-hydroxybenzoate, n-octyl p-hydroxybenzoate, resorcin, dodecyl gallate 4,4-dihydroxydiphenylsulfone, bis(4-hydroxyphenyl)sulfide, bis(4-hydroxyphenyl)ethane, 1,1-bis(4-hydroxyphenyl)propane, 1,1-bis(4-hydroxyphenyl)n-butane, 1,1-bis(4-hydroxyphenyl)n-pentane, 1,1-bis(4-hydroxyphenyl)n-hexane, 1,1-bis(4-hydroxyphenyl)n-heptane, 1,1-bis(4-hydroxyphenyl)n-octane, 1,1-bis(4-hydroxyphenyl)n-nonane, 1,1-bis(4-hydroxyphenyl)n-decane, 1,1-bis(4-hydroxyphenyl)n-dodecane, 1,1-bis(4-hydroxyphenyl)-2-methylpropane, 1,1-bis(4-hydroxyphenyl)-3-methylbutane 1,1-bis(4-hydroxyphenyl)-3-methylpentane, 1,1-bis(4-hydroxyphenyl)-2,3-dimethylpentane 1,1-bis(4-hydroxyphenyl)-2-ethylbutane, 1,1-bis(4-hydroxyphenyl)-2-ethylhexane, 1,1-bis(4-hydroxyphenyl)-3,7-dimethyloctane, 1,1-bis(4-hydroxyphenyl)cyclohexane, 1,1-bis(4-hydroxyphenyl)-3,3,5-trimethylcyclohexane, 1-phenyl-1,1-bis(4-hydroxyphenyl)ethane, 2,2-bis(4-hydroxyphenyl) propane 2,2-bis(4-hydroxyphenyl)n-butane, 2,2-bis(4-hydroxyphenyl)n-pentane, 2,2-bis(4-hydroxyphenyl)n-hexane, 2,2-bis(4-hydroxyphenyl)n-heptan, 2,2-bis(4-hydroxyphenyl)n-octane, 2,2-bis(4-hydroxyphenyl)n-nonane, 2,2-bis(4-hydroxyphenyl)n-decane, 22-bis(4-hydroxyphenyl)n-dodecane, 2,2-bis(4-hydroxyphenyl)ethyl propionate, 2,2-bis(4-hydroxyphenyl)-4-methylpentane, 2,2-bis(4-hydroxyphenyl)-4-methylhexane, 2,2-bis(4-hydroxyphenyl)hexafluoropropane, 2,2-bis(4-hydroxy-3-methylphenyl)propane 9,9-bis(4-hydroxy-3-methylphenyl)fluorene, 1,1-bis[2-(4-hydroxyphenyl)-2-propyl]benzene, bis(2)-hydroxyphenyl)methane, 1,1,1-tris(4-hydroxyphenyl)ethane, and 3,3-bis-(3-methyl-4-hydroxyphenyl)butane.

Although the compounds having phenolic hydroxyl groups can develop the thermochromic properties most effectively, it is also possible to use compounds selected from the group consisting of aromatic carboxylic acids, aliphatic carboxylic acids having 2 to 5 carbon atoms, metal salts of carboxylic adds, acidic phosphoric esters and metal salts thereof, and 1,2,3-triazole and derivatives thereof.

The component (c) of the reaction medium which reversibly induces an electron transfer reaction between the component (a) and the component (b) in a specific temperature range will be described. Examples of the component (c) include esters, ketones, ethers, alcohols, and acid amides.

As the component (c), there may be used a carboxylic acid ester compound which discolors with showing a large hysteresis characteristic with regard to a color density-temperature curve (a curve plotting a change in color density with a temperature change is different between the case where the temperature is changed from a low temperature side to a high temperature side and the case where the temperature is changed from a high temperature side to a low temperature side), is capable of forming a reversibly thermochromic composition having a color-memory property, and shows a ΔT value (melting point-cloud point) ranging from 5° C. to, less than 50° C., for example, a carboxylic acid ester containing a substituted aromatic ring in the molecule, an ester of a carboxylic acid containing an unsubstituted aromatic ring with an aliphatic alcohol having 10 or more carbon atoms, a carboxylic acid ester containing a cyclohexyl group in the molecule, an ester of a fatty acid having 6 or more carbon atoms with an unsubstituted aromatic alcohol or phenol, an ester of a fatty acid having 8 or more carbon atoms with a branched aliphatic alcohol, an ester of a dicarboxylic acid with an aromatic alcohol or a branched aliphatic alcohol, dibenzyl cinnamate, heptyl stearate, didecyl adipate, dilauryl adipate, dimyristyl adipate, dicetyl adipate, distearyl adipate, trilaurin, trimyristin, tristearin, dirnyristin, or distearin.

A fatty add ester compound obtained from an aliphatic monohydric alcohol having an odd number not less than 9 of carbon atoms, and an aliphatic carboxylic acid having an even number of carbon atoms, and a fatty acid ester compound with a total carbon number of 17 to 23 to be obtained from n-pentyl alcohol or n-heptyl alcohol and an aliphatic carboxylic acid having an even number from 10 to 16 of carbon atoms, are also effective.

Specific examples thereof include n-pentadecyl acetate, n-tridecyl butyrate, n-pentadecyl butyrate, n-undecyl caproate, n-tridecyl caproate, n-pentadecyl caproate, n-nonyl caprylate, n-undecyl caprylate, n-tridecyl caprylate, n-pentadecyl caprylate, n-heptyl caprate, n-nonyl caprate, n-undecyl caprate, n-tridecyl caprate, n-pentadecyl caprate, n-pentyl laurate, n-heptyl laurate, n-nonyl laurate, n-undecyl laurate, n-tridecyl laurate, n-pentadecyl laurate, n-pentyl myristate, n-heptyl myristate, n-nonyl myristate, n-undecyl myristate, n-tridecyl myristate, n-pentadecyl myristate, n-pentyl palmitate, n-heptyl palmitate, n-nonyl palmitate, n-undecyl palmitate, n-tridecyl palmitate, n-pentadecyl palmitate, n-nonyl stearate, n-undecyl stearate, n-tridecyl stearate, n-pentadecyl stearate, n-nonyl eicosanoate, n-undecyl eicosanoate n-tridecyl eicosanoate, n-pentadecyl eicosanoate, n-nonyl behenate, n-undecyl behenate, n-tridecyl behenate, and n-pentadecyl behenate.

As the ketones, aliphatic ketones with a total carbon number of 10 or more are effectively employed. Examples thereof include 2-decanone, 3-decanone, 4-decanone, 2-undecanone, 3-undecanone, 4-undecanone, 5-undecanone, 2-dodecanone, 3-dodecanone, 4-dodecanone, 5-dodecanone, 2-tridecanone, 3-tridecanone, 2-tetradecanone, 2-pentadecanone, 8-pentadecanone, 2-hexadecanone, 3-hexadecanone, 9-heptadecanone, 2-pentadecanone, 2-octadecanone, 2-nonadecanone, 10-nonadecanone, 2-eicosanone, 11-eicosanone, 2-heneicosanone, 2-docosanone, laurone, and stearone.

Furthermore, examples thereof include aryl alkyl ketones with a total carbon number of 12 to 24 such as n-octadecanophenone, n-heptadecanophenone n-hexadecanophenone, n-pentadecanophenone, n-tetradecanophenone, 4-n-dodecaacetophenone n-tridecanophenone, 4-n-undecanoacetophenone, n-laurophenone, 4-n-decanoacetophenone n-undecanophenone, 4-n-nonylacetophenone, n-decanophenone, 4-n-octylacetophenone, n-nonanophenone, 4-n-heptylacetophenone, n-octanophenone, 4-n-hexylacetophenone, 4-n-cyclohexylacetophenone, 4-tert-butylproplophenone, n-heptaphenone, 4-n-pentylacetophenone, cyclohexyl phenyl ketone, benzyl n-butyl ketone, 4-n-butylacetophenone, n-hexanophenone 4-isobutylacetophenone, 1-acetonaphthone, 2-acetonaphthone, and cyclopentyl phenyl ketone.

As the ethers, aliphatic ethers with a total carbon number of 10 or more are effectively employed. Examples thereof include dipentyl ether, dihexyl ether, diheptyl ether, dioctyl ether, dinonyl ether, dodecyl ether, diundecyl ether, didodecyl ether, ditridecyl ether, ditetraderyl ether, dipentadecyl ether, dihexadecyl ether, dioctadecyl ether, decanediol dimethyl ether, undecanediol dimethyl ether, dodecanediol dimethyl ether, tridecanediol dimethyl ether, decanediol diethyl ether, and undecanediol diethyl ether.

As the alcohols, an aliphatic monohydric saturated alcohol having 10 or more carbon atoms is effectively employed. Examples thereof include decyl alcohol, undecyl alcohol, dodecyl alcohol, tridecyl alcohol, tetradecyl alcohol, pentadecyl alcohol, hexadecyl alcohol, heptadecyl alcohol, octadecyl alcohol, eicosyl alcohol, and dococyl alcohol.

As the add amides, there may be mentioned hexanamide, heptanamide, octanamide, nonanamide, decanamide, undecanamide, laurylamide, tridecanamide, myristamide, palmitamide stearamide, and docosanamide.

As the component (c), a compound expressed by the following Formula (1) may be used;

[Chem. 1]

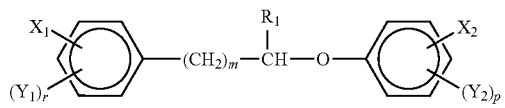

(1)

(wherein $R_1$ represents a hydrogen atom, or a methyl group, m represents an integer of 0 to 2, one of $X_1$ and $X_2$ represents —$(CH_2)_n OCOR_2$ or —$(CH_2)_n COOR_2$, the other represents a hydrogen atom; n represents an integer of 0 to 2; $R_2$ represents an alkyl or alkenyl group having 4 or more carbon atoms, $Y_1$ and $Y_2$ represent a hydrogen atom, an alkyl group having 1 to 4 carbon atoms, a methoxy group, or a halogen, and r and p represent an integer of 1 to 3.)

Among compounds represented by the Formula (1), those in which $R_1$ is a hydrogen atom are suitable, because a reversibly thermochromic composition with a wider hysteresis width is obtainable, and those in which $R_1$ is a hydrogen atom and m is 0 are more suitable.

Among the compounds represented by the Formula (1), compounds represented by the following Formula (2) are used more preferably:

[Chem. 2]

(2)

wherein R is an alkyl or alkenyl group having 8 or more carbon atoms, preferably an alkyl group having 10 to 24 carbon atoms, and more preferably an alkyl group having 12 to 22 carbon atoms.

Specific examples of the compound include 4-benzyloxyphenylethyl octanoate, 4-benzyloxyphenylethyl nonanoate, 4-benzyloxyphenylethyl decanoate, 4-benzyloxyphenylethyl undecanoate, 4-benzyloxyphenylethyl dodecanoate, 4-benzyloxyphenylethyl tridecanoate, 4-benzyloxyphenylethyl tetradecanoate, 4-benzyloxyphenylethyl pentadecanoate, 4-benzyloxyphenylethyl hexadecanoate, 4-benzyloxyphenylethyl heptadecanoate, and 4-benzyloxyphenylethyl octadecanoate.

Further, as the component (c), a compound represented by the following Formula (3) may be used:

[Chem. 3]

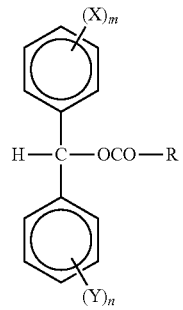

(3)

(wherein R represents an alkyl or alkenyl group having 8 or more carbon atoms, m and n independently represent an integer of 1 to 3, and each X and Y independently represent a hydrogen atom, an alkyl group having 1 to 4 carbon atoms, an alkoxy group having 1 to 4 carbon atoms, or a halogen).

Specific examples of the compound include 1,1-diphenylmethyl octanoate, 1,1-diphenylmethyl nonanoate, 1,1-diphenylmethyl decanoate, 1,1-diphenylmethyl undecanoate, 1,1-diphenylmethyl dodecanoate, 1,1-diphenylmethyl tridecanoate, 1,1-diphenylmethyl tetradecanoate, 1,1-diphenylmethyl pentadecanoate, 1,1-diphenylmethyl hexadecanoate, 1,1-diphenylmethyl heptadecanoate, or 1,1-diphenylmethyl octadecanoate.

Furthermore, as the component (c), a compound represented by the following Formula (4) may be used:

[Chem. 4]

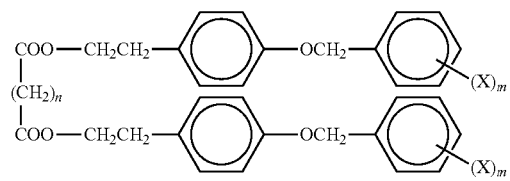

(4)

(wherein X represents a hydrogen atom, an alkyl group having 1 to 4 carbon atoms, a methoxy group, or a halogen atom, m represents an integer of 1 to 3, and n represents an integer of 1 to 20).

Examples of the compound include diester of masonic add with 2-[4-(4-chlorobenzyloxy)phenyl]ethanol, diester of succinic acid with 2-(4-benzyloxyphenyl)ethanol, diester of succinic acid with 2-[4-(3-methylbenzyloxy)phenyl)]ethanol, diester of glutaric acid with 2-(4-benzyloxyphenyl)ethanol, diester of glutaric acid with 2-[4-(4-chlorobenzyloxy)phenyl)]ethanol, diester of adipic acid with 2-(4-benzyloxyphenyl)ethanol, diester of pimelic acid with 2-(4-benzyloxyphenyl)ethanol, diester of suberic acid with 2-(4-benzyloxyphenyl)ethanol, diester of suberic acid with 2-[4-(3-methylbenzyloxy)phenyl)]ethanol, diester of suberic acid with 2-[4-(4-chlorobenzyloxy)phenyl)]ethanol, diester of suberic acid with 2-[4-(2,4-dichlorobenzyloxy)phenyl)]ethanol, diester of azelaic acid with 2-(4-benzyloxyphenyl)ethanol, diester of sebacic acid with 2-(4-benzyloxyphenyl)ethanol, diester of 1,10-decanedicarboxylic acid with 2-(4-benzyloxyphenyl)ethanol, diester of 1,18-octadecanedicarboxylic acid with 2-(4-benzyloxyphenyl)

ethanol, and diester of 1,18-octadecanedicarboxylic acid with 2-[4-(2-methyl benzyloxy)phenyl)]ethanol.

Furthermore, as the component (c), a compound represented by the following Formula (5) may be used:

[Chem. 5]

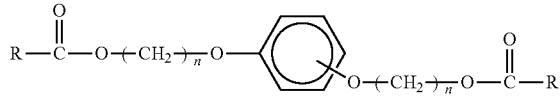

(5)

(wherein R represents an alkyl group, an alkenyl group, a cycloalkyl group, or a cycloalkylalkyl group having 1 to 21 carbon atoms, and n represents an integer of 1 to 3.)

Examples of the compound include diester of capric add with 1,3-bis(2-hydroxyethoxy)benzene, diester of undecanoic acid with 1,3-bis(2-hydroxyethoxy)benzene, diester of lauric acid with 1,3-bis(2-hydroxyethoxy)benzene, diester of myristic acid with 1,3-bis(2-hydroxyethoxy)benzene, diester of palmitic acid with 1,3-bis(2-hydroxyethoxy)benzene, diester of cyclohexanecarboxylic acid with 1,3-bis(2-hydroxyethoxy)benzene, diester of cyclohexanepropionic acid with 1,3-bis(2-hydroxyethoxy)benzene, diester of butyric acid with 1,4-bis(hydroxymethoxy)benzene diester of isovaleric acid with 1,4-bis(hydroxymethoxy)benzene, diester of acetic acid with 1,4-bis(2-hydroxyethoxy)benzene, diester of propionic acid with 1,4-bis(2-hydroxyethoxy)benzene, diester of valeric acid with 1,4-bis(2-hydroxyethoxy)benzene, diester of caproic acid with 1,4-bis(2-hydroxyethoxy)benzene diester of carpylic acid with 1,4-bis(2-hydroxyethoxy)benzene, diester of capric acid with 1,4-bis(2-hydroxyethoxy)benzene, diester of lauric acid with 1,4-bis(2-hydroxyethoxy)benzene diester of myristic acid with 1,4-bis(2-hydroxyethoxy)benzene, and diester of cyclohexanepropionic acid with 1,4-bis(2-hydroxyethoxy)benzene.

Furthermore, as the component (c), a compound represented by the following Formula (6) may be used;

[Chem. 6]

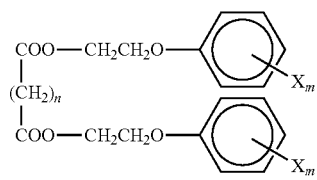

(6)

(wherein X represents a hydrogen atom, an alkyl group having 1 to 4 carbon atoms, an alkoxy group having 1 to 4 carbon atoms, or a halogen atom, m represents an integer of 1 to 3, and n represents an integer of 1 to 20).

Examples of the compound include diester of succinic add with 2-phenoxyethanol, diester of suberic add with 2-phenoxyethanol, diester of sebacic add with 2-phenoxyethanol, diester of 1,10-decanedicarboxylic acid with 2-phenoxyethanol or diester of 1,18-octadecanedicarboxylic acid with 2-phenoxyethanol.

Furthermore, as the component (c), a co pound represented by the following Formula (7) may be used;

[Chem. 7]

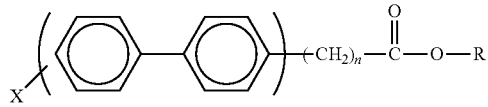

(7)

(wherein R represents an alkyl group having 4 to 22 carbon atoms, a cycloalkylalkyl group, a cycloalkyl group, or an alkenyl group having 4 to 22 carbon atoms, X represents a hydrogen atom, an alkyl group having 1 to 4 carbon atoms, an alkoxy group having 1 to 4 carbon atoms, or a halogen atom, and n represents 0 or 1).

Examples of the compound include decyl 4-phenylbenzoate, lauryl 4-phenylbenzoate, myristyl 4-phenylbenzoate, cyclohexylethyl 4-phenylbenzoate, octyl 4-biphenylacetate, nonyl 4-biphenylacetate, decyl 4-biphenylacetate lauryl 4-biphenylacetate, myristyl 4-biphenylacetate, tridecyl 4-biphenylacetate, pentadecyl 4-biphenylacetate, cetyl 4-biphenylacetate, cyclopentyl 4-biphenylacetate cyclohexylmethyl 4-biphenylacetate, hexyl 4-biphenylacetate, and cyclohexylmethyl 4-biphenylacetate.

Furthermore, as the component (c), a core pound represented by the following Formula (8) may be used:

[Chem. 8]

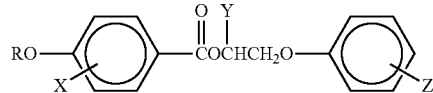

(8)

wherein R represents an alkyl group having 3 to 18 carbon atoms or an aliphatic acyl group having 3 to 18 carbon atoms, X represents a hydrogen atom, an alkyl group having 1 to 3 carbon atoms, an alkoxy group having 1 or 2 carbon atoms, or a halogen atom, y represents a hydrogen atom or a methyl group, and Z represents a hydrogen atom, an alkyl group having 1 to 4 carbon atoms, an alkoxy group having 1 or 2 carbon atoms, or a halogen atom).

Examples of the compound include phenoxyethyl 4-butoxybenzoate, phenoxyethyl 4-pentyloxybenzoate, phenoxyethyl 4-tetradecyloxybenzoate, an ester of phenoxyethyl 4-hydroxybenzoate and dodecanoic acid, and a dodecyl ether of phenoxyethyl vanilliate.

Furthermore, as the component (c), a compound represented by the following Formula (9) may be used:

[Chem. 9]

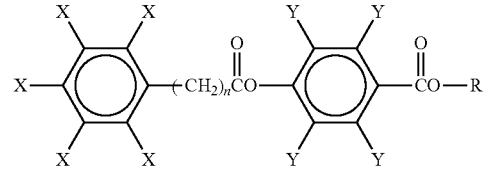

(9)

(wherein R represents an alkyl group having 4 to 22 carbon atoms, an alkenyl group having 4 to 22 carbon atoms, a cycloalkyl alkyl group, or a cycloalkyl group, X represents a hydrogen atom, an alkyl group, an alkoxy group, or a halogen atom, Y represents a hydrogen atom, an alkyl group, an alkoxy group or a halogen atom, and n represents 0 or 1).

Examples of the compound include a benzoic acid ester of octyl p-hydroxybenzoate, a benzoic acid ester of decyl p-hydroxybenzoate, a p-methoxybenzoic acid ester of heptyl p-hydroxybenzoate, an o-methoxybenzoic acid ester of dodecyl p-hydroxybenzoate and a benzoic ester of cyclohexylmethyl p-hydroxybenzoate.

Furthermore, as the component (c), a compound represented by the following Formula (10) may be used:

[Chem. 10]

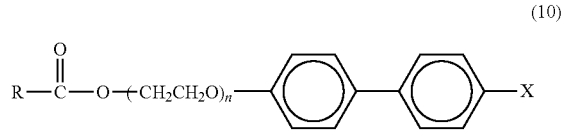

(10)

(wherein R represents an alkyl group having 3 to 17 carbon atoms, a cycloalkyl group having 3 to 8 carbon atoms, or a cycloalkylalkyl group having 5 to 8 carbon atoms, X represents a hydrogen atom, an alkyl group having 1 to 5 carbon atoms, a methoxy group, an ethoxy group, or a halogen atom, and n represents an integer of 1 to 3.)

Examples of the compound include diester of 4-phenylphenol ethylene glycol ether and cyclohexanecarboxylic acid, diester of 4-phenylphenol diethylene glycol ether and lauric acid, diester of 4-phenylphenol triethylene glycol ether and cyclohexanecarboxylic acid, diester of 4-phenylphenol ethylene glycol ether and octanoic acid, diester of 4-phenylphenol ethylene glycol ether and nonanoic acid, diester of 4-phenylphenol ethylene glycol ether and decanoic acid, and diester of 4-phenylphenol ethylene glycol ether and myristic acid.

As an electron-accepting compound, a microcapsule pigment encapsulating a reversibly thermochromic composition of heat color-developing type (a color is developed by heating and lost by cooling) using a specific alkoxyphenol compound having straight chain or side chain alkyl group having 3 to 18 carbon atoms (JP H11612 623A, JP H11-5973 A), a specific hydroxybenzoic ester (JP 2001-105732 A), a gallic ester (JP S51-44706A, JP 2003-253149 A) or the like may be applied (see FIG. 3).

Though the ratio of the components (a), (b) and (c) to be mixed depends on the concentration, discoloration temperature, discoloration mode and kind of each component, the component ratio at which desired discoloration characteristics can be generally obtained is in the range of 0.1 to 50, preferably 0.5 to 20 of the component (b), and in the range of 1 to 800, preferably from 5 to 200 of the component (c), based on 1 of the component (a) (each of the aforementioned ratios is expressed as part(s) by mass).

In this regard, it is also possible to cause interchangeable color change from a color (1) to a color (2) by incorporating a coloring agent such as a non-thermochromic dyestuff or pigment into the microcapsule pigment or ink.

Examples of the microencapsulation method of the reversibly thermochromic composition include interfacial polymerization, interfacial polycondensation, in situ polymerization, submerged coat hardening, phase separation from an aqueous solution, phase separation from an organic solvent, melt dispersion cooling, aerial suspension coating and spray drying.

Examples of the material of the capsule include an epoxy resin, a urea resin, a urethane resin, and an isocyanate resin.

Further, the microcapsule can be put into practical use after forming a secondary resin coating film on the surface thereof in accordance with the intended use, so as to impart the microcapsule with durability or to modify the surface properties.

The microcapsule pigment preferably has an average particle diameter of 0.1 to 5.0 μm, more preferably 0.1 to 4.0 μm, and still more preferably 0.5 to 3.0 μm.

The microcapsule pigment preferably satisfies the requirement that a mass ratio between the reversibly thermochromic composition and the wall membrane of the microcapsule falls within the range of 7:1 to 1:1 (ratio by mass), preferably 6:1 to 1:1.

When the average particle diameter of the microcapsule pigment exceeds 5.0 μm, it is difficult to obtain a smooth writing feeling when the microcapsule pigment is used in a writing instrument, and when an average value of a maximum outer diameter is less than 0.1 μm, it becomes difficult to exhibit high-density color development.

The microcapsule pigment having an average particle diameter in the above range, particularly in the range of 0.5 to 3.0 μm, exhibits high-density color development, and a good ejection property is easily obtained when the microcapsule pigment is used in a writing instrument.

When the ratio of the reversibly thermochromic composition to the wall membrane is larger than the above range, the thickness of the wall membrane becomes too thin, and resistance to pressure and heat tends to decrease. When the ratio of the wall membrane to the reversibly thermochromic composition is larger than the above range, the color density and vividness at the time of color development tend to decrease.

In the measurement of the average particle diameter, a region of particles is determined using an image analysis type particle size distribution measuring software "Mac-View" manufactured by Mountech Co., Ltd., a projected area equivalent circle diameter (Heywood diameter) is calculated from the area of the region of particles, and the average particle diameter is measured as an average particle diameter of particles equivalent to an equal volume sphere based on the calculated value.

When the particle diameter of all particles or most of the particles exceed 0.2 μm, the average particle diameter can be measured as an average particle diameter of particles equivalent to an equal volume sphere by the Coulter method using a particle size distribution analyzer (manufactured by Beckman-Coulter, Inc., product name: Multisizer 4e).

Although a specific gravity of the microcapsule pigment adjusted according to the above depends on the particle diameter of the microcapsule, components encapsulated in the microcapsule and their contents, the component and membrane thickness of the wall membrane of the microcapsule, and the colored state and temperature of the pigment, the specific gravity is preferably in the range of 1.05 to 1.20 and more preferably 1.10 to 1.20 when the microcapsule pigment is in a completely colored state and water is used as a reference material at 20° C., A particularly preferred range is from 1.12 to 1.15. The microcapsule pigment which easily keeps the colored state before and after discoloration, that is, has a large hysteresis width ΔH often uses the component (c) having two or more aromatic rings in the molecule, and has the large specific gravity described above. In the case of combining such a pigment with a vehicle described later, sinking and floating of the microcapsule pigment is suppressed when the vehicle is affected by vibration or the like from the outside due to transportation or the like even though the vehicle has a low viscosity.

The specific gravity of the microcapsule pigment is a numerical value confirmed according to the following measurement method.

(Method of Measuring Specific Gravity of Microcapsule Pigment)

1. 30 ml of an aqueous glycerin solution and 1 g of a completely colored microcapsule pigment are introduced into a screw vial and mixed to obtain a microcapsule pigment dispersion.

2. 30 ml of the microcapsule pigment dispersion is set in a centrifuge at 1000 rpm for 30 seconds. A centrifugal separator used is a tester (product name: desktop cooling centrifuge H103 N, manufactured by Kokusan Co., Ltd.), and a microcapsule dispersion adjusted to 20° C. is used.

3. The microcapsule pigment dispersion is observed.

When most of the microcapsule pigment is precipitated at a bottom of a beaker, the operations of 1 to 2 are performed again using an aqueous solution having a higher glycerin concentration than an aqueous glycerin solution at this time, and the state of the dispersion is observed.

When a state where most of the microcapsule pigment are floating on the liquid surface is confirmed, the operations of 1 to 2 are performed again using an aqueous solution having a lower glycerin concentration than then aqueous glycerin solution at this time, and the state of the dispersion is observed.

The above series of operations are repeated until not the state where most of the microcapsule pigments are floating on the liquid surface or are precipitated, but a state where the portions other than the liquid surface of the aqueous glycerin solution and the vicinity of the bottom of the screw vial are uniformly colored is visually confirmed. The specific gravity of the aqueous glycerin solution at the time when this state is observed is measured, and the measured specific gravity is determined as the specific gravity of the microcapsule pigment. The specific gravity of the aqueous glycerin solution is measured according to the buoy method described in NS K0061 7.1. At this time, a sample adjusted to 20° C. is used.

The color development and fluidity of handwriting according to the ink composition according to the present invention are susceptible to the influence of the particle diameter of the microcapsule pigment. Although the microcapsule pigment having a particle diameter outside the above numerical range has a low coloring density or poor fluidity, the content contained in the entire microcapsule pigment is small, and the effect on the performance of the ink composition is small. Such a pigment having a particle diameter outside the numerical range is lighter or heavier in specific gravity than a pigment having a particle diameter within the numerical range, and is precipitated at the bottom of the screw vial in the aqueous glycerin solution prepared as described above or floats on the liquid surface. Meanwhile, since the microcapsule pigment bringing good properties to the ink composition according to the present invention floats in an aqueous solution, it is important that the specific gravity of the aqueous solution at this time is the specific gravity of the vehicle in order to obtain an ink composition having excellent dispersion stability and good color development of handwriting.

The ink composition can contain the microcapsule pigment in an amount of 5 to 40% by mass, preferably 10 to 40% by mass, and more preferably 15 to 35% by mass, based on the total mass of the ink composition.

If the content of the microcapsule pigment is less than 5% by mass, the coloring density is insufficient. If the content exceeds 40% by mass, the ink outflow property tends to be reduced, and writing performance tends to be impaired.

(Vehicle)

The vehicle used in the ink composition according to the present invention comprises water and a specific gravity adjuster. In the present invention, the specific gravity adjuster is soluble in water, and even when the viscosity of the vehicle is low, the specific gravity adjuster prevents the microcapsule pigment from sinking, floating, and localizing in the ink when the ink composition is externally stimulated by vibration or the like.

The sedimentation and floating stability of the pigment are maximized when a difference in specific gravity between the vehicle and the pigment is minimal. In the ink composition according to the present invention, the specific gravity adjuster brings the specific gravity of the vehicle closer to the specific gravity of the microcapsule pigment. Since the specific gravity of the vehicle depends on the specific gravity of an aqueous substance dissolved in the vehicle and the amount thereof added, when a more amount of the specific gravity adjuster having a large specific gravity is added and dissolved in the vehicle, the specific gravity of the vehicle can be further increased.

The specific gravity adjuster used in the ink composition according to the present invention can be dissolved in the vehicle and can be adjusted so that the specific gravity of the vehicle approaches the specific gravity of the microcapsule pigment, and examples thereof include an oxyacid belonging to Group 6 in the range of atomic weight 90 to 185 and salt thereof.

The oxyacid and salt thereof used in the present invention are selected from the group consisting of oxyacid of a transition metal element and salt thereof, and it is said that the oxyacid ion is obtained by forming a tetrahedron or octahedron in which four or six oxygen atoms are usually coordinated to metal atoms or the like. The tetrahedral or octahedral unit may be a single unit, or a polyacid having a structure in which they are bonded via edges and apexes and a polyacid salt as a salt thereof may be used. The polyacid is a multiple acid formed by condensation of an oxyacid of a metal element, but is constituted by only one kind of metal, a polyacid in which anions to be condensed are of the same type is referred to as an isopolyacid, and a polyacid in which two or more types of anions are condensed is referred to as a heteropolyacid. The respective salts thereof are referred to as isopolyacid salt and heteropolyacid salt. The polyacid includes isopolyacid and heteropolyacid, and the polyacid salt include isopolyacid salt and heteropolyacid salt.

Specific examples of the specific gravity adjuster used in the present invention include molybdic acid and tungstic acid as a single oxyacid and sodium molybdate, potassium molybdate, ammonium molybdate, sodium tungstate, potassium tungstate, ammonium tungstate, lithium tungstate, and magnesium tungstate as salt. Examples of isopolyacids include metamolybdic acid, paramolybdic acid, metatungstic acid, paratungstic acid, and isotungstic acid, and examples of isopolyacid salts include sodium metamolybdate, potassium metamolybdate, ammonium metamolybdate, sodium paramolybdate, potassium paramolybdate, ammonium paramolybdate, sodium metatungstate, potassium metatungstate, ammonium metatungstate, barium metatungstate, sodium paratungstate, and sodium isotungstate. Examples of heteropolyacids include molybdophosphoric acid, molybdosilicic acid, tungstophosphoric acid, and tungstosilicic acid, and examples of heteropolyacid salts include sodium molybdophosphate, sodium molybdosilicate, sodium tungstophosphate, and sodium tungstosilicate. These oxyacids and salts thereof can be used alone or in combination of two or more.

Among the above, there are preferred metatungstic acid, paratungstic acid, sodium metatungstate, potassium metatungstate, ammonium metatungstate, barium metatungstate, sodium paratungstate, sodium isotungstate, tungstophosohoric acid, tungstosilicic acid, sodium tungstophosphate, and sodium tungstosilicate, and particularly, more preferred are sodium isotungstate, sodium metatungstate and sodium paratungstate.

The above-mentioned sodium isotungstate, sodium metatungstate, and sodium paratungstate are not only highly safe, but also have a high specific gravity per se, so that it is easy to adjust a liquid with a high specific gravity according to the amount added, and they are suitable as a viscosity modifier for the vehicle of the present invention.

The content of the specific gravity adjuster in the present invention is preferably 2% by mass to 20% by mass, more preferably 5 to 15% by mass, based on the total mass of the ink composition. If the content of the specific gravity adjuster is less than 2% by mass, the effect of adjusting the specific gravity of the vehicle is poor, and if the content of the specific gravity adjuster exceeds 20% by mass, the microcapsule pigment tends to be easily aggregated.

A ratio of the mass of the specific gravity adjuster to the mass of the microcapsule pigment is preferably 0.05 to 4.0, more preferably 0.075 to 2.0, and still more preferably 0.1 to 1.5.

The vehicle contains at least water in addition to the specific gravity adjuster, and its content is preferably 30 to 80% by mass, more preferably from 40 to 70% by mass, massed on the total mass of the ink composition.

In the ink composition according to the present invention, the vehicle has a specific gravity in the numerical range of 1.00 to 1.30. The preferable numerical range of the specific gravity is 1.05 to 1.20, and more preferably 1.08 to 1.15. The specific gravity of the vehicle is 0.90 times to 1.20 times, preferably 0.95 times to 1.10 times, and more preferably 0.97 times to 1.05 times the specific gravity of the microcapsule pigment.

When the specific gravity of the vehicle is within the above numerical range and the specific gravity of the vehicle is within the above numerical range based on the specific gravity of the microcapsule pigment, it is important to keep the specific gravity of the vehicle within the above numerical range in order to prevent the microcapsule pigment from sinking, floating and localizing in the ink when subjected to external vibration due to transportation or the like while keeping the vehicle low in viscosity, and to provide excellent dispersion stability.

For the viscosity of the ink composition according to the present invention, in consideration of the free-flowing properties and dispersion stability of the composition, the viscosity of the ink composition at 20° C. is preferably 3 to 25 mPa·s, and more preferably 4 to 20 mPa·s when measured at a rotation speed of 6 rpm. The viscosity of the ink composition is still more preferably 5 to 15 mPa·s. When measured at a rotation speed of 12 rpm, the viscosity of the ink composition is preferably 2 to 20 mPa·s, more preferably 3 to 15 mPa·s, and still more preferably 4 to 15 mPa·s. At a rotation speed of 30 rpm, the viscosity of the ink composition is preferably 1 to 20 mPa·s, more preferably 2 to 15 mPa·s, and still more preferably 3 to 10 mPa·s. The viscosity of the ink composition can be measured at 20° C. using a BL-type rotational viscometer (product name: TVB-M-type viscometer, L-type rotor, manufactured by Toki Sangyo Cod, Ltd.).

In addition, a surface tension of the ink composition according to the present invention is preferably 25 to 50 mN/m in a 20° C. environment. When the surface tension is within the above numerical range, when the ink composition is applied to a sheet of paper, wettability of the ink composition to a surface to be coated can be improved, and there is a tendency that bleeding and passing through the surface to be coated can be prevented. In consideration of coatability, the surface tension of the ink composition is more preferably 30 to 45 mN/m.

The surface tension is measured and determined by a vertical plate method in a 20° C. environment, using a surface tension measuring device manufactured by Kyowa Interface Science, Inc and a glass plate.

The ink composition according to the present invention provides excellent dispersion stability of the microcapsule pigment by having the above-mentioned composition and specific gravity, and further can provide an ink composition excellent in fluidity by having the above-mentioned viscosity. A writing instrument using such an ink composition provides excellent ink ejection properties and has excellent color development with little variable-density difference, so that a good handwriting can be formed, and therefore, the ink composition according to the present invention can be used as an ink composition for a writing instrument.

Since the ink composition according to the present invention has the above-mentioned surface tension, it is possible to obtain an ink composition having excellent wettability to paper, bleed resistance and resistance against passing through paper, so that it is possible to obtain a more preferable ink composition as an ink for a writing instrument.

The ink composition according to the present invention may contain the following additives as long as the specific gravity of the vehicle does not exceed the above numerical, range; however, at that time, considering the free-flowing properties of the ink composition, its viscosity is preferably within the above numerical range.

(Polymeric Coagulant)

The composition according to the present invention preferably contains a polymeric coagulant in the vehicle. The microcapsule pigment forms a loose aggregate through the polymeric coagulant, and the microcapsule pigments are prevented from contacting and aggregating, so that the dispersion stability of the microcapsule pigment can be further improved.

Examples of the polymeric coagulant include polyvinylpyrrolidones, polyethylene oxides and, aqueous polysaccharides, and preferred is the aqueous polysaccharides. Examples of the aqueous polysaccharides include tragacanth gum, guar gum, pullulan, cyclodextrin, and an aqueous cellulose derivative, and preferred is the aqueous cellulose derivative. Specific examples of the aqueous cellulose derivatives include methyl cellulose, hydroxyethyl cellulose, hydroxypropyl cellulose, hydroxyethylmethyl cellulose, and hydroxypropylmethyl cellulose, and carboxymethyl cellulose, and, they are preferably used. Considering the dispersion stability, a more preferable polymeric coagulant is hydroxyethyl cellulose.

Specific examples of the polymeric coagulant used in the present invention include HEC series A, S, and CF grades (manufactured by Sumitomo Seika Chemicals Co., Ltd.), HEC Daicel SP, SE, and EE series (manufactured by Daicel Finechem Ltd.), CELLOSIZE WP, QP, and EP series (manufactured by Dow Chemical Japan Co., Ltd.), and SANHEC (manufactured by Sansho Co., Ltd.), and they can be preferably used.

The content of the polymeric coagulant in the present invention is preferably 0.1 to 1.0% by mass, more preferably 0.3 to 0.5% by mass, based on the total mass of the ink composition.

(Dispersant)

The ink composition according to the present invention preferably contains a dispersant. When the dispersant is included in the vehicle, it is possible to enhance the dispersibility of the microcapsule pigment.

Although the ink composition according to the present invention preferably contains a dispersant and a polymeric coagulant, only the dispersant may be used, or both may be used in combination. When the dispersant and the polymeric coagulant are used in combination, not only the dispersibility of the microcapsule pigment is improved, but also the dispersibility of the loose aggregate formed by the polymeric coagulant is increased, so that the dispersion stability of the microcapsule pigment can be further improved.

Known dispersants can be used as the dispersant, and examples thereof include synthetic resins such as polyvinylpyrrolidone, polyvinyl butyral, polyvinyl ether, styrene-maleic acid copolymers, ketone resins, hydroxyethyl cellulose and derivatives thereof, and styrene-acrylic acid copolymers, olefin-maleic add copolymers and alkali-neutralized products thereof, acrylic polymer compounds, PO-EC) adducts, and amine base oligomers of polyesters. Preferred are the olefin-maleic acid copolymers and alkali-neutralized products thereof, and acrylic polymer compounds. In consideration of the dispersibility of the microcapsule pigment, a preferred dispersant for the ink composition according to the present invention is an acrylic polymer compound. As the acrylic polymer compound, it is possible to use materials such as polyacrylic acid, an acrylic acid-maleic acid copolymer, an acrylic urethane copolymer, and alkali-neutralized products thereof, but more preferred is an acrylic polymer compound having a carboxyl group, and still more preferred is an acrylic polymer compound having a comb-shaped structure having a carboxyl group in the side chain. A particularly preferred dispersant for the present invention is an acrylic polymer compound having a comb-shaped structure having a plurality of carboxyl groups in the side chain, and specific examples thereof include product name: Solsperse 43000 manufactured by Japan Lubrizol Corporation.

The content of the dispersant is preferably 0.01 to 2% by mass, more preferably 0.1 to 1.5% by mass, based on the total mass of the ink composition. When the content of the dispersant is less than 0.1% by mass, the effect of improving the dispersibility is not seen, and when the content is, more than 2% by mass, there is a tendency that a reversibly thermochromic pigment is likely to sink and float when an influence such as vibration is applied from the outside.

(Dispersion Enhancer)

The composition of the present invention can enhance stability of the dispersant and maintain dispersibility by including a dispersion enhancer in the vehicle.

As the dispersion enhancer, an aqueous resin, particularly an aqueous alkyd resin, an acrylic resin, a styrene-maleic acid copolymer, a cellulose derivative, polyvinylpyrrolidone, polyvinyl alcohol, or dextrin, or the like is preferably used, and more preferred are the polyvinylpyrrolidone and the polyvinyl alcohol. In consideration of the stability of the dispersant, a more preferable dispersion enhancer is polyvinyl alcohol, a still more preferable dispersion enhancer is partial saponification type polyvinyl alcohol, and an even more preferable dispersion enhancer is partial saponification type polyvinyl alcohol having a saponification degree of 70 to 89 mol %.

Specific examples of the dispersion enhancer used in the present invention include J-Poval JP, JL, and JR grades (manufactured by Japan Vam & Poval Co., Ltd.), Gohsenol G type and K type (manufactured by Nippon Synthetic Chemical Industry Co., Ltd.), and PVA 203, 205, 210, 217, 217E, 217EE, 220, 220E, 224E, 403, 405, 420, 420H, 424H, 505, L-8, L-9, L-9-78 and L-10 (all manufactured by Kuraray Co., Ltd.), which are preferably used.

The content of the dispersion enhancer is preferably 0.1 to 1.5% by mass, more preferably 0.5 to 1.0% by mass, based on the total mass of the ink composition. When the content of the dispersion enhancer is within the above numerical range, the stability of the dispersant is improved without impairing the color development and discoloration properties of the microcapsule pigment.

(Aqueous Organic Solvent)

The ink composition according to the present invention can contain an aqueous organic solvent. The aqueous organic solvent is contained to suppress water evaporation, facilitate prevention of fluctuations in the specific gravity of the vehicle and maintenance of good dispersion stability of the microcapsule pigment, and facilitate stabilization of a structure of a loose aggregate formed by a polymeric coagulant or the polymeric coagulant and a dispersant.

Specific examples of the aqueous organic solvent include ethanol, propanol, butanol, glycerin, sorbitol, triethanolamine, diethanolamine, monoethanolamine, ethylene glycol, diethylene glycol, thioethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, and N-methyl-2-pyrrolidone.

In the ink composition according to the present invention, when the microcapsule pigment has a specific gravity higher than 1 and the specific gravity of the vehicle is adjusted, the adjustment is facilitated by using an aqueous organic solvent having a higher specific gravity than, water, and therefore, an aqueous organic solvent having a specific gravity of more than 1.1, such as glycerin, is preferably used.

The content of the aqueous organic solvent is preferably 1 to 40% by mass, more preferably 5 to 30% by mass, based on the total mass of the ink composition. The content of the aqueous organic solvent is particularly preferably 10 to 25% by mass. When the content of the aqueous organic solvent is less than 1% by mass, an effect of suppressing water evaporation is poor, and when the content exceeds 40% by mass, dissolution stability of the specific gravity adjuster tends to be reduced.

(Other)

The ink composition according to the present invention may contain, if necessary, a dye such as an acid dye, a basic dye, a direct dye, a reactive dye, a vat dye, a sulfur dye, a gold-containing dye, a cationic dye, and a disperse dye, a wetting agent such as a preservative, a fluorine-based surfactant, and a nonionic surfactant, a resin having water-solubility in resins used as a fixer such as an acrylic resins, an urethane resin, a styrene-butadiene resin, an alkyd resin, a sulfamide resin, a maleic acid resin, a polyvinyl acetate resin, an ethylene-vinylacetate resin, a vinyl chloride-vinyl acetate resin, a copolymer of styrene and maleic ester, a styrene-acrylonitrile resin, cyanate-modified polyalkylene glycol, ester gum, a xylene resin, a urea resin, a urea aldehyde resin, a phenol resin, an alkylphenol resin, a terpene phenol resin, a rosin-based resin or a hydrogenated compound thereof, a rosin phenol resin, a polyvinyl alkyl ether, a polyamide resin, a polyolefin resin, a nylon resin, a polyester resin, and a cyclohexanone resin, a pH conditioner, an antifoaming agent, a shear viscosity reduction-imparting agent, a viscosity modifier, a rust inhibitor such as benzotriazole, tolyltriazole, dicyclohexylammonium nitrite, disaccharides nitrite, and saponin, urea, nonionic surfactants, reduced or non-reduced starch hydrolysates, disaccharides such as trehalose, oligosaccharide, sucrose, cyclodextrin, glucose, dextrin, sorbitol, mannitol, a wetting agent such as sodium pyrophosphate, and an antifoaming agent.

Furthermore, in the case of adding a sulfur-based extreme-pressure additive such as 2,5-dimercapto-1,3,4-thiadiazole and/or a salt thereof, it is possible to suppress dispersion defects or aggregation of the microcapsule pigment occurring after a frozen ink thawed again even when the pH of the ink is in an acidic or alkaline region, to prevent an increase of viscosity of the ink or the accompanying disconnection of the handwriting or color lightening, and further to prevent corrosion of a ball.

In the case of adjusting the pH at 20° C. to 3 to 7, preferably 4 to 7, more preferably 5 to 7, the ink composition according to the present invention can further suppress aggregation and sedimentation of the contained microcapsule pigment in a low temperature range and further facilitates improvement of formability of a loose aggregate formed by a polymeric coagulant or the polymeric coagulant and a dispersant.

The ink composition according to the present invention may contain, in addition to the above additives, substances insoluble in the vehicle. Specific examples thereof include inorganic pigments such as carbon black, titanium oxide, zinc oxide, iron black, yellow iron oxide, red iron oxide, metal oxides such as complex oxide-based pigments, and ultramarine blue, organic pigments such as azo pigments, indigo pigments, phthalocyanine pigments, quinacridone pigments, thioindigo pigments, sulene pigments, perinone pigments, perylene pigments, phthalone pigments, dioxane pigments, isoindolinone pigments, metal complex pigments, methine/azomethine pigments, and diketopyrrolopyrrole pigments, glittering pigments such as aluminum pigments and glass flake pigments, extenders such as kaolin, talc, mica, clay, bentonite, calcium carbonate, aluminum hydroxide, sericite, and potassium titanate, and resin particles containing an emulsion containing a water-insoluble resin in the resin, a polyolefin resin, an acrylic resin, a nylon resin, a silicone resin, and a urethane resin, a fluororesin and the like.

In the inorganic pigments, the organic pigments, and the glittering pigments, the pigment surface may be covered with a wall membrane material of a metal oxide such as aluminum oxide, zinc oxide, titanium oxide, and zirconium oxide, inorganic oxides such as silicon dioxide, fatty acid, and a microcapsule pigment.

These substances insoluble in the vehicle preferably have a specific gravity close to the specific gravity of the vehicle in consideration of dispersion stability.

The ink composition according to the present invention can express various color changes by containing the above dyes and pigments.

As described above, when the ink composition according, to the present invention contains a polymeric coagulant and a dispersant, the dispersion stability of the microcapsule pigment is further improved, and when vibration or the like is applied from the outside, the microcapsule pigment is easily prevented from sinking and floating in the ink. In addition, when the ink composition contains an aqueous organic solvent, water evaporation is suppressed, and it becomes easier to prevent fluctuations in the specific gravity of the vehicle and maintain good dispersion stability of the microcapsule pigment, and to stabilize a structure of a loose aggregate formed by the polymeric coagulant or the polymeric coagulant and the dispersant and further improve the dispersion stability of the microcapsule pigment. Therefore, these additives are preferably contained. Since the dispersion stability is further enhanced by further containing a dispersion enhancer, the ink composition according to the present invention more preferably contains the dispersion enhancer together with a polymeric coagulant and a dispersant.

The ink composition according to the present invention can be produced by any conventionally known method. Specifically, the above components are added in required amounts and mixed with various agitators such as a propeller stirrer, a homodisper, or a homomixer, or various dispersers such as a bead mill, whereby the ink composition can be produced.

(Writing Instrument)

The ink composition is used by filling it in a writing instrument such as a fudepen, a fountain pen, and a calligraphy pen in addition to a marking pen or a ballpoint pen having a marking pen tip or a ballpoint pen tip attached to a writing front-end.

When the ink composition is filled in a ballpoint pen, the structure and shape of the ballpoint pen itself are not particularly limited. Examples thereof include a ballpoint pen having a structure in which ink is placed directly inside an axial barrel, an ink flow adjusting member including a comb groove-shaped ink flow adjusting member and a fiber bundle is interposed, and the ink flow adjusting member and a tip are connected, and a ballpoint pen having an ink-storing tube in which an ink is filled in an axial barrel, in which the ink-storing tube is connected with a tip where a ball is mounted on its front-end, and a liquid plug for preventing backflow is closely contacted in the edge of the ink.

The ballpoint pen tip will be explained in more detail. There can be applied a tip formed by holding a ball in a ball holding part in which the vicinity of a front-end of a metal pipe is pressed and deformed inwardly from the outside; a tip formed by holding a ball in a ball holding part formed by cutting a metal material by a drill and the like; a tip in which a ball receiving sheet made of a resin is provided in the tip made of metal or plastic; or a tip in which a ball held in the tip is pressed in a front direction by a spring.

The ball made of cemented carbide, stainless steel, ruby, ceramic, resin, rubber, and the like, and having a diameter of about 0.3 to 3.0 mm, preferably 0.4 to 1.5 mm, and more preferably 0.5 to 1.0 mm can be applicable.

As the ink-storing tube which stores the ink, for example, a molded article formed of a thermoplastic resin such as polyethylene, polypropylene, polyethylene terephthalate, or nylon can be used.

The ink-storing tube may be directly connected with the tip, or the ink-storing tube may be connected with the tip via a connection member.

Incidentally, the ink-storing tube may be a refill type in which the refill is stored in an axial barrel made of a resin or metal, or the ink may be directly filled in an axial barrel in which the axial barrel mounting a tip in its front-end is used itself as an ink-storing tube.

An ink follower is filled at the rear end of the ink stored in the ink-storing tube.

The composition of the ink follower includes a non-volatile liquid or a hardly volatile liquid.

Specific examples thereof include vaseline, spindle oil, castor oil, olive oil, mineral oil refineries, liquid paraffine, polybutene, α-olefine, oligomer and co-oligomer of α-olefine, dimethyl silicone oil, methylphenyl silicone oil, amino modified silicone oil, polyether modified silicone oil, and fatty acid modified silicone oil. It can be used alone or in combination of two or more thereof.

It is preferable that the viscosity of the non-volatile liquid and/or hardly volatile liquid be increased to a suitable viscosity by adding a thickening agent. There may be mentioned, as the thickening agent, silica having hydrophobic treated surface; particulate silica having a methylated surface; aluminum silicate; swellable mica; a clay-based thickening agent such as hydrophobically treated bentonite or montmorilonite; fatty acid metal soaps such as magnesium stearate, calcium stearate aluminum stearate, and zinc stearate; a dextrin-based compound such as tribenzylidene sorbitol, fatty acid amide, amide modified polyethylene wax, hydrogenated castor oil, or fatty acid dextrin; and a cellulose-based compound.

Further, it is also possible to use a liquid ink follower in combination with a solid ink follower.

In the case where the ink composition is filled in a marking pen, the structure and shape of the marking pen itself are not particularly limited. Examples thereof include a marking pen in which an ink occlusion body containing fiber bundle is embedded in an axial barrel, a marking pen tip containing a processed fiber or a resin molded product having a capillary gap therein is mounted directly or via a connection member on the axial barrel, and an ink is impregnated into the ink occlusion body of the marking pen formed by connecting the ink occlusion body and the tip, a marking pen having a structure in which ink is placed directly inside an axial barrel, an ink flow adjusting member including a comb groove-shaped ink flow adjusting member and a fiber bundle is interposed, and the ink flow adjusting member and the tip are connected, and a marking pen in which the tip and the ink-storing tube are arranged through a valve body that opens by pressing the tip and the ink is stored directly in the ink-storing tube.

The tip is a generally known porous member having communication pores of which porosity is selected within the range of about 30 to 70%, made of processed resin of fibers, fusion processed bodies of hot-melt fiber, or a felt, or an extrusion molded product of a synthetic resin having a plurality of ink delivering holes extending in the axial direction, and the tip is provided for practical use by processed its one end in a cannonball form, a rectangular form, or a chisel form depending on the purpose.

The ink occlusion body is configured by bundling crimped fibers in a length direction, incorporating them into a covering material such as a plastic tube or a film, and adjusting its porosity within a range of about 40 to 90%.

As the valve body, a generally known pumping type may be used, and also it is preferred the one in which a spring pressure is adjusted so that the valve can be opened by pen pressure.

The shape of the ballpoint pen or marking pen is not limited to the above-described one, but may be a multiple writing instrument (i.e., a both head type or a pen-front drawing type) in which tips of different type are provided or pen ends for introducing inks of different colors are provided.

A writing instrument suitable for the ink composition according to the present invention is a marking pen in which an ink occlusion body containing fiber bundle is embedded in an axial barrel, a marking pen tip containing a processed fiber or a resin molded product having a capillary gap therein is mounted directly or via a connection member on the axial barrel, and an ink is impregnated into the ink occlusion body of the marking pen formed by connecting the ink occlusion body and the tip, or a ballpoint pen or a marking pen having a structure in which ink is placed directly inside an axial barrel, an ink flow adjusting member including a comb groove-shaped ink flow adjusting member and a fiber bundle is interposed, and the ink flow adjusting member and the tip are connected. The writing instrument is more preferably the marking pen in which the ink occlusion body containing fiber bundle is embedded in the axial barrel, the marking pen tip containing the processed fiber or the resin molded product having the capillary gap therein is mounted directly or via the connection member on the axial barrel, and the ink is impregnated into the ink occlusion body of the marking pen formed by connecting the ink occlusion body and the tip. Since the writing instrument having such a mechanism is required to have free-flowing properties at a low viscosity in the ink composition to be used from the viewpoint of ink sup liability to the tip, the ink composition according to the present invention is particularly suitable for writing instruments having the above mechanism and can be preferably used as a reversibly thermochromic aqueous ink composition for a writing instrument, particularly a reversibly thermochromic aqueous ink composition for a marking pen.

The writing instrument having the above-described structure preferably includes a cap.

The writing instrument may be a retractable writing instrument having a structure in which an ink occlusion body impregnated with ink is stored in an ink-storing tube, a pen body is attached to a writing front-end to prepare a refill, and the refill is stored in an axial barrel so that the writing front-end is protruded from an opening of the axial barrel by actuation of an in-and-out type mechanism.

A method for operating the in-and-out type mechanism may be, for example, a knock type, a rotation type, or a slide type.

The handwriting formed with a writing instrument storing the ink composition can be discolored by rubbing with a finger or application of a heating tool or a cooling tool.

As the heating tool, for example, an electro-heating discoloration device equipped with a resistance heating element, a heating discoloration device loaded with hot water or the like, or a hair dryer can be suitably used; however, a friction member or a friction body is preferably used as a means which enables discoloration by a simple method.

As the frictional member or the frictional body, an elastic body such as an elastomer or a plastic foamed body, which has a good elasticity and can generate frictional heat by an appropriate friction is preferable; however, a plastic molded body, stone, wood, metal and cloth may be used as well.

In this connection, the handwriting can be rubbed by means of a gum eraser but, since bits of the eraser are generated at rubbing, the friction member as mentioned above is preferably used.

As materials for the friction member or the friction body, a silicone resin, an SEBS resin (styrene-ethylene-butadiene-styrene block copolymer), an SEPS resin (styrene ethylene propylene styrene block copolymer), a polyester resin, or EPDM (ethylene propylene diene rubber) is suitably used but the SEBS resin is more suitably used since the silicone resin tends to adhere to the portion erased with rubbing and the handwriting tends to be repelled at repeated writing.

The frictional member may be a member (frictional body) having any suitable shape separate from the writing instrument, but portability is improved when fixing the frictional body to the writing instrument.

The portion to which the friction member is fixed may be a cap front part (apex part) or a barrel rear part (portion on which a writing front-end is not mounted).

As the cooling tool, for example, a cryogenic discoloration device utilizing a Peltier element, a cryogenic discoloration device loaded with a refrigerant such as cold water or crushed ice, a refrigerator, or a freezer can be suitably used.

In addition, a writing instrument set can also be obtained by combining the writing instrument and a friction body.

EXAMPLES

The following will illustrate the ink compositions according to the present invention and writing instruments using the same but the invention is not limited thereto.

Incidentally, the term "part(s)" in the following Examples means part(s) by mass.

Example 1

Preparation of Microcapsule Pigment

A microcapsule pigment suspension which included a reversibly thermochromic composition having a color-memory property and composed of 3.00 parts of 3',6'-bis[phenyl(3-methylphenyl)amino]-spiro[isobenzofuran-1(3H) 9'-[9H]xanthen]-3-one as the component (a), 5.00 parts of 4-4'-[2,2,2-trifluoro-1-(trifluoromethyl)ethylidene]diphenyl as the component (b), 3.00 parts of 4-4'-(2-ethylhexylidene) bisphenol, and 50.00 parts of cyclohexylmethyl-4-biphenyl acetate as the component (c) was obtained.

The suspension was centrifuged to isolate the microcapsule pigment.

The average particle diameter of the microcapsule pigment was 1.9 μm, the complete decoloring temperature was 61 to 62° C., and the complete coloring temperature was −20° C. The pigment changed color from blue to colorless through a change in temperature.

Preparation of Ink Composition 0.40 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 62.80 parts of water were mixed, and then 13.00 parts of sodium polytungstate (trade name: SPT-1SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.128.

As a result of measuring the specific gravity of the microcapsule pigment at 20° C., the specific gravity was 1.13 to 1.14, and the specific gravity of the vehicle was 0.99 to 1.00 times the specific gravity of the microcapsule pigment.

As a result of measuring the viscosity of the ink composition using a BL type viscometer (product name: TVB-M-type viscometer, L-type rotor, manufactured by Toki Sangyo Co., Ltd.), the viscosity at 20° C. was 9.10 mPa·s at a rotational speed of 6 rpm, 7.44 mPa·s at a rotational speed of 12 rpm, and 6.23 mPa·s at a rotational speed of 30 rpm.

At 20° C., the surface tension of the ink composition was 35.27 mN/m, and the pH value was 6.33.

Preparation of Filled-In Type Writing Instrument (see FIG. 4)

An ink absorbent 2 prepared by covering a polyester sliver with a synthetic resin film was impregnated with the ink composition and inserted into an axial barrel 4 made of a polypropylene resin. Then, the axial barrel was assembled with a resin-processed pen body 3 (chisel shape) made of polyester fibers via a holder 5 in such a manner that the front end of the axial barrel was in connection with the pen body, and a cap was fitted thereto to obtain a filled-in type writing instrument 1 (marking pen).

The rear end portion of the axial barrel has an SEBS resin attached as a friction member 7.

Using the marking pen, a blue letter (handwriting) was formed by writing on a sheet of paper.

The handwriting was blue at room temperature (20° C.), but the handwriting discolored and became colorless when rubbed using the friction member fitted to the rear end portion of the axial barrel. This state was kept under room temperature. When the sheet of paper was cooled to −20° C. or less, the color was returned to original blue, and the discoloration behavior was reproduced repeatedly.

Example 2

Preparation of Microcapsule Pigment

A microcapsule pigment suspension which included a reversibly thermochromic composition having a color-memory property and composed of 3.00 parts of 3',6'-bis[phenyl(3-methylphenyl)amino]-spiro[isobenzofuran-1(3H) 9'-[9H]xanthen]-3-one as the component (a), 5.00 parts of 4-4'-[2,2,2-trifluoro-1-(trifluoromethyl)ethylidene]diphenol as the component (b), 3.00 parts of 4-4'-(2-ethylhexylidene) bisphenol, and 50.00 parts of 2-[4-(phenylmethoxy) phenyl] ethyldecanoate as the component (c) was obtained.

The suspension was centrifuged to isolate the microcapsule pigment.

The average particle diameter of the microcapsule pigment was 1.9 μm, the complete decoloring temperature was 60° C., and the complete coloring temperature was 20° C. The pigment changed color from blue to colorless through a change in temperature.

Preparation of Ink Composition 0.40 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glyracil 2000, manufactured by Lonza Japan Ltd.) as a preservative, and 65.80 parts of water were mixed, and then 10.00 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.094.

As a result of measuring the specific gravity of the microcapsule pigment at 20° C., the specific gravity was 1.08 to 1.09, and the specific gravity of the vehicle was 1.00 to 1.01 times the specific gravity of the microcapsule pigment.

As a result of measuring the viscosity of the ink composition using the BL type viscometer, the viscosity at 20° C. was 8.20 mPa·s at a rotational speed of 6 rpm, 6.68 mPa·s at a rotational speed of 12 rpm, and 5.55 mPa·s at a rotational speed of 30 rpm.

At 20° C., the surface tension of the ink composition was 33.43 mN/m, and the pH value was 6.55.

Preparation of Filled-In Type Writing Instrument (see FIG. 4)

A filled-in type writing instrument (marking pen) was obtained in the same procedure as in Example 1.

Using the marking pen, a blue letter (handwriting) was formed by writing on a sheet of paper.

The handwriting was blue at room temperature (20° C.), but the handwriting discolored and became colorless when rubbed using the friction member fitted to the rear end portion of the axial barrel. This state was kept under room temperature. When the sheet of paper was cooled to −20° C. or less, the color was returned to original blue, and the discoloration behavior was reproduced repeatedly.

Example 3

Preparation of Microcapsule Pigment

A microcapsule pigment suspension which included a reversibly thermochromic composition having a color-memory property and composed of 6.00 parts of 6'-(diphenylamino)-2'-[(3-(trifluoromethyl)phenyl)-(dipentylamino)-2'-[(3-(trifluoromethyl)phenyl)amino]-spiro[isobenzofuran-1(3H),9'-(9H)xanthen]-3-one as the component (a), 6.00 parts of 4-4'-[2,2,2-trifluoro-1-(trifluoromethyl)ethylidene] diphenol as the component (b), 4.00 parts of 4-4'-(2-ethylhexylidene)bisphenol, and 50.00 parts of cyclohexylmethyl-4-biphenyl acetate as the component (c) was obtained.

The suspension was centrifuged to isolate the microcapsule pigment.

The average particle diameter of the microcapsule pigment was 1.9 μm, the complete decoloring temperature was 61 to 62° C., and the complete coloring temperature was −20° C. The pigment changed color from green to colorless through a change in temperature.

Preparation of Ink Composition 0.40 parts of polymeric coagulant (hydroxyethyl cellulose, trade name CELL SIZE EP-09, manufactured by Dow Chemical Japan Co., Ltd.), 0.40 parts of acrylic polymeric dispersant (trade name: Solsperse 43000, manufactured by Japan Lubrizol Corporation), 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 60.80 parts of water were mixed, and then 15.00 parts of sodium polytungstate (trade name: SPT-1, SOMETU.) was added as a specific gravity adjuster to obtain a vehicle.

23.00 parts of a completely colored microcapsule pigment and a vehicle were, mixed to obtain an ink composition.

As a result of measuring the specific gravity of the vehicle at 20° C. when water was used as a reference material, the specific gravity was 1.138.

As a result of measuring the specific gravity of the microcapsule pigment at 20° C., the specific gravity was 1.13 to 1.14, and the specific gravity of the vehicle was 1.00 to 1.01 times the specific gravity of the microcapsule pigment.

As a result of measuring the viscosity of the ink composition using the BL type viscometer, the viscosity at 20° C. was 9.20 mPa·s at a rotational speed of 6 rpm, 7.54 mPa·s at a rotational speed of 12 rpm, and 6.36 mPa·s at a rotational speed of 30 rpm.

At 20° C., the surface tension of the ink composition was 38.01 mN/m, and the pH value was 6.12.

Preparation of Filled-In Type Writing Instrument (see FIG. 5)

An ink absorbent 2 prepared by covering a polyester sliver with a synthetic resin film was impregnated with the ink composition and inserted into an axial barrel 4 made of a polypropylene resin. Then, the axial barrel was assembled with a marking pen tip 3 (cannonball shape) made of polyester fibers via a holder 5 in such a manner that the front end of the axial barrel was in connection with the marking pen tip, and a cap 6 was fitted thereto to obtain a writing instrument 1 (marking pen).

An SEBS resin was fitted to the cap at the apex thereof as a friction member 7.

Using the marking pen, a green letter (handwriting) was formed by writing on a sheet of paper.

The handwriting was green at room temperature (20° C.), but the handwriting discolored and became colorless when rubbed using the friction member fitted to the cap. This state was kept under room temperature. When the sheet of paper was cooled to −20° C. or less, the color was returned to original green, and the discoloration behavior was reproduced repeatedly.

Example 4

Preparation of Microcapsule Pigment

According to the preparation of the microcapsule pigment of Example 1, the microcapsule pigment was prepared and isolated.

Preparation of Ink Composition 0.40 parts of polymeric coagulant (hydroxyethyl cellulose, trade name CELLOSIZE EP-09, manufactured by Dow Chemical Japan Co., Ltd.), 0.20 parts of pyridine-2-thiol-1-oxide, sodium salt (trade name: sodium of omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 63.20 parts of water were mixed, and then 13.00 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.128.

As a result of measuring the specific gravity of the microcapsule pigment at 20° C., the specific gravity was 1.13 to 1.14, and the specific gravity of the vehicle was 0.99 to 1.00 times the specific gravity of the microcapsule pigment.

As a result of measuring the viscosity of the ink composition using the BL type viscometer, the viscosity at 20° C. was 9.30 mPa·s at a rotational speed of 6 rpm, 7.55 mPa·s at a rotational speed of 12 rpm, and 6.14 mPa·s at a rotational speed of 30 rpm.

At 20° C., the surface tension of the ink composition was 35.84 mN/m and the pH value was 6.31.

Preparation of Filled-In Type Writing Instrument (see FIG. 4)

A filled-in type writing instrument (marking pen) was obtained in the same procedure as in Example 1.

Using the marking pen, a blue letter (handwriting) was formed by writing on a sheet of paper.

The handwriting was blue at room temperature (20° C.), but the handwriting discolored and became colorless when rubbed using the friction member fitted to the rear end portion of the axial barrel. This state was kept under room temperature. When the sheet of paper was cooled to −20° C. or less, the color was returned to original blue, and the discoloration behavior was reproduced repeatedly.

Example 5

Preparation of Microcapsule Pigment

According to the preparation of the microcapsule pigment of Example 1, the microcapsule pigment was prepared and isolated.

Preparation of Ink Composition 0.20 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 51.00 parts of water were mixed, and then 13.00 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.263.

As a result of measuring the specific gravity of the microcapsule pigment at 20° C., the specific gravity was 1.13 to 1.14, and the specific gravity of the vehicle was 1.11 to 1.12 times the specific gravity of the microcapsule pigment.

As a result of measuring the viscosity of the ink composition using the BL type viscometer, the viscosity at 20° C. was 4.80 mPa·s at a rotational speed of 6 rpm, 3.79 mPa's at a rotational speed of 12 rpm, and 3.39 mPa-s at a rotational speed of 30 rpm.

At 20° C., the surface tension of the ink composition was 28.70 mN/m, and the pH value was 6.51.

Preparation of Filled-In Type Writing Instrument (see FIG. 4)

A filled-in type writing instrument (marking pen) was obtained in the same procedure as in Example 1.

Using the marking pen, a blue letter (handwriting) was formed by writing on a sheet of paper.

The handwriting was blue at room temperature (20° C.), but the handwriting discolored and became colorless when rubbed using the friction member fitted to the rear end portion of the axial barrel. This state was kept under room temperature. When the sheet of paper was cooled to 20° C. or less, the color was returned to original blue, and the discoloration behavior was reproduced repeatedly.

Example 6

Preparation of Microcapsule Pigment

According to the preparation of the microcapsule pigment of Example 2, the microcapsule pigment was prepared and isolated.

Preparation of Ink Composition 0.80 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 0.20 parts of pyridine-2-thiol-1-oxide, sodium salt (trade name: sodium omazine 40%, manufactured by Lonza. Japan Ltd.) as a preservative, 0.20 parts of 3-iodo-2-propynylbutyl carbamate (trade name: Glycacil 2000, manufactured by Lonza Japan Ltd.) as a preservative, and 73.40 parts of water were mixed, and then 13.00 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.019.

As a result of measuring the specific gravity of the microcapsule pigment at 20° C., the specific gravity was 1.08 to 1.09, and the specific gravity of the vehicle was 0.93 to 0.94 times the specific gravity of the microcapsule pigment.

As a result of measuring the viscosity of the ink composition using the BL type viscometer, the viscosity at 20° C. was 16.50 mPa·s at a rotational speed of 6 rpm, 13.60 mPa·s at a rotational speed of 12 rpm, and 11.36 mPa·s at a rotational speed of 30 rpm.

At 20° C., the surface tension of the ink composition was 33.09 mN/m, and the pH value was 6.53.

Preparation of Filled-In Type Writing Instrument (see FIG. 4)

A filled-in type writing instrument (marking pen) was obtained in the same procedure as in Example 1.

Using the marking pen, a blue letter (handwriting) was formed by writing on a sheet of paper.

The handwriting was blue at room temperature (20° C.), but the handwriting discolored and became colorless when rubbed using the friction member fitted to the rear end portion of the axial barrel. This state was kept under room temperature. When the sheet of paper was cooled to −20° C. or less, the color was returned to original blue, and the discoloration behavior was reproduced repeatedly.

Example 7

Preparation of Microcapsule Pigment

According to the preparation of the microcapsule pigment of Example 2, the microcapsule pigment was prepared and isolated.

Preparation of Ink Composition 0.40 parts of polymeric coagulant (hydroxyethyl cellulose, trade name CELLOSIZE EP-09, manufactured by Dow Chemical Japan Co., Ltd.), 0.05 parts of acrylic polymeric dispersant (trade name: Solsperse 43000, manufactured by Japan Lubrizol Corporation), 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 66.15 parts of water were mixed, and then 13.00 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.094.

As a result of measuring the specific gravity of the microcapsule pigment at 20° C., the specific gravity was 1.08 to 1.09, and the specific gravity of the vehicle was 1.00 to 1.01 times the specific gravity of the microcapsule pigment.

As a result of measuring the viscosity of the ink composition using the BL type viscometer, the viscosity at 20° C. was 10.10 mPa·s at a rotational speed of 6 rpm, 7.97 mPa·s at a rotational speed of 12 rpm, and 6.37 mPa·s at a rotational speed of 30 rpm.

At 20° C., the surface tension of the ink composition was 30.25 mN/m, and the pH value was 6.36.

Preparation of Filled-In Type Writing Instrument (see FIG. 4)

A filled-in type writing instrument (marking pen) was obtained in the same procedure as in Example 1.

Using the marking pen, a blue letter (handwriting) was formed by writing on a sheet of paper.

The handwriting was blue at room temperature (20° C.), but the handwriting discolored and became colorless when rubbed using the friction member fitted to the rear end portion of the axial barrel. This state was kept under room temperature. When the sheet of paper was cooled to −20° C. or less, the color was returned to original blue, and the discoloration behavior was reproduced repeatedly.

Example 8

Preparation of Microcapsule Pigment

According to the preparation of the microcapsule pigment of Example 2, the microcapsule pigment was prepared and isolated.

Preparation of Ink Composition 0.40 parts of polymeric coagulant (hydroxyethyl cellulose, trade name CELLOSIZE EP-09, manufactured by Dow Chemical Japan Co., Ltd.), 1.00 parts of acrylic polymeric dispersant (trade name: Solsperse 43000, manufactured by Japan Lubrizol Corporation), 0.20 parts of pyridine-2-thiol-1-oxide, sodium salt (trade name: sodium omazine 40%, manufactured by Lonza Japan Ltd.) as a preservative 0.20 parts of 3-iodo-2-propynylbutyl carbamate (trade name: Glycacil 2000, manufactured by Lonza Japan Ltd.) as a preservative, and 50.20 parts of water were mixed, and then 13.00 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.263.

As a result of measuring the specific gravity of the microcapsule pigment at 20° C., the specific gravity was 1.08 to 1.09, and the specific gravity of the vehicle was 1.16 to 1.17 times the specific gravity of the microcapsule pigment.

As a result of measuring the viscosity of the ink composition using the BL type viscometer, the viscosity at 20° C. was 7.80 mPa·s at a rotational speed of 6 rpm, 6.40 mPa·s at a rotational speed of 12 rpm, and 5.48 mPa·s at a rotational speed of 30 rpm.

At 20° C., the surface tension of the ink composition was 32.00 mN/m, and the pH value was 6.74.

Preparation of Filled-In Type Writing Instrument (see FIG. 4)

A filled-in type writing instrument (marking pen) was obtained in the same procedure as in Example 1.

Using the marking pen, a blue letter (handwriting) was formed by writing on a sheet of paper.

The handwriting was blue at room temperature (20° C.), but the handwriting discolored and became colorless when rubbed using the friction member fitted to the rear end portion of the axial barrel. This state was kept under room temperature. When the sheet of paper was cooled to 20° C. or less, the color was returned to original blue, and the discoloration behavior was reproduced repeatedly.

Example 9

Preparation of Microcapsule Pigment

According to the preparation of the microcapsule pigment of Example 1, the microcapsule pigment was prepared and isolated.

Preparation of Ink Composition 0.40 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 10.00 parts of glycerin, 0.20 parts of pyridine-2-thiol-1-oxide, sodium salt (trade name; sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 55.80 parts of water were mixed, and then 10.00 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.170.

As a result of measuring the specific gravity of the microcapsule pigment at 20° C., the specific gravity was 1.13 to 1.14, and the specific gravity of the vehicle was 1.03 to 1.04 times the specific gravity of the microcapsule pigment.

As a result of measuring the viscosity of the ink composition using the BL type viscometer, the viscosity at 20° C. was 12.40 mPa·s at a rotational speed of 6 rpm, 10.05 mPa·s at a rotational speed of 12 rpm, and 8.51 mPa·s at a rotational speed of 30 rpm.

At 20° C., the surface tension of the ink composition was 34.68 mN/m, and the pH value was 6.70.

Preparation of Filled-In Type Writing Instrument (see FIG. 6)

An ink absorbent 2 prepared by covering a polyester sliver with a synthetic resin film was impregnated with the ink composition and inserted into an axial barrel 4 made of a polypropylene resin. Then, the axial barrel was assembled with a pen body 3 (cannonball shape) formed of an extrusion molded product of a polyacetal resin having a plurality of ink delivering holes extending in the axial direction via a holder 5 in such a manner that the front end of the axial barrel was in connection with the pen body, and a cap was fitted thereto to obtain a filled-in type writing instrument 1 (marking pen).

The cap front part has an SEBS resin attached as a friction member.

Using the marking pen, a blue letter (handwriting) as formed by writing on a sheet of paper.

The handwriting was blue at room temperature (20° C.), but the handwriting discolored and became colorless when rubbed using the friction member fitted to the cap front part. This state was kept under room temperature. When the sheet of paper was cooled to −20° C. or less, the color was returned to original blue, and the discoloration behavior was reproduced repeatedly.

Example 10

Preparation of Microcapsule Pigment

According to the preparation of the microcapsule pigment of Example 1, the microcapsule pigment was prepared and isolated.

Preparation of Ink Composition 0.40 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 20.00 parts of glycerin, 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 49.30 parts of water were mixed, and then 6.50 parts of sodium polytungstate (trade name: SPT-1, SOMETU.) was added as a specific gravity adjuster to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.159.

As a result of measuring the specific gravity of the microcapsule pigment at 20° C., the specific gravity was 1.13 to 1.14, and the specific gravity of the vehicle was 1.02 to 1.03 times the specific gravity of the microcapsule pigment.

As a result of measuring the viscosity of the ink composition using the BL type viscometer, the viscosity at 20° C. was 15.50 mPa·s at a rotational speed of 6 rpm, 12.76 mPa·s at a rotational speed of 12 rpm, and 11.00 mPa·s at a rotational speed of 30 rpm.

At 20° C., the surface tension of the ink composition was 35.69 mN/m, and the pH value was 6.93.

Preparation of Filled-In Type Writing Instrument (see FIG. 6)

A filled-in type writing instrument (marking pen) was obtained in the same procedure as in Example 9.

Using the marking pen, a blue letter (handwriting) was formed by writing on a sheet of paper.

The handwriting was blue at room temperature (20° C.), but the handwriting discolored and became colorless when rubbed using the friction member fitted to the cap front part. This state was kept under room temperature. When the sheet of paper was cooled to −20° C. or less, the color was returned to original blue, and the discoloration behavior was reproduced repeatedly.

Example 11

Preparation of Microcapsule Pigment

According to the preparation of the microcapsule pigment of Example 1, the microcapsule pigment was prepared and isolated.

Preparation of Ink Composition 0.40 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 22.00 parts of glycerin, 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, 0.20 parts of silicone antifoaming agent (trade name: FS Antifoam 013A, manufactured by Dow Corning Toray Co., Ltd.) as an antifoaming agent, 0.05 parts of phosphoric acid, and 53.55 parts of water were mixed, and then 6.00 parts of sodium polytungstate (trade name: SPT-1, SOMETU.) was added as a specific gravity adjuster to obtain a vehicle.

17.00 parts of a completely colored microcapsule pigment and a vehicle were mixed to obtain an ink composition.

As a result of measuring the specific gravity of the vehicle at 20° C. when water was used as a reference material, the specific gravity was 1.148.

As a result of measuring the specific gravity of the microcapsule pigment at 20° C., the specific gravity was 1.13 to 1.14, and the specific gravity of the vehicle was 1.01 to 1.02 times the specific gravity of the microcapsule pigment.

As a result of measuring the viscosity of the aqueous ink composition using the BL type viscometer, the viscosity at 20° C. was 11.60 mPa·s at a rotational speed of 6 rpm, 9.66 mPa·s at a rotational speed of 12 rpm, and 8.65 mPa·s at a rotational speed of 30 rpm.

At 20° C., the surface tension of the ink composition was 35.04 mN/m, and the pH value was 6.99.

Preparation of Filled-In Type Writing Instrument (see FIG. 6)

A filled-in type writing instrument (marking pen) was obtained in the same procedure as in Example 9.

Using the marking pen, a blue letter (handwriting) was formed by writing on a sheet of paper.

The handwriting was blue at room temperature (20° C.), but the handwriting discolored and became colorless when rubbed using the friction member fitted to the cap front part. This state was kept under room temperature. When the sheet of paper was cooled to −20° C. or less, the color was returned to original blue, and the discoloration behavior was reproduced repeatedly.

Example 12

Preparation of Microcapsule Pigment

According to the preparation of the microcapsule pigment of Example 1, the microcapsule pigment was prepared and isolated.

Preparation of Ink Composition 0.40 parts of polymeric coagulant (hydroxyethyl cellulose, trade name CELLOSIZE EP-09, manufactured by Dow Chemical Japan Co., Ltd.), 0.40 parts of acrylic polymeric dispersant (trade name: Solsperse 43000, manufactured by Japan Lubrizol Corporation), 18.00 parts of glycerin, 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, 0.20 parts of silicone antifoaming agent (trade name: FS Antifoam 013A, manufactured by Dow Corning bray Co., Ltd.) as an antifoaming agent, 0.05 parts of phosphoric acid, and 53.55 parts of water were mixed, and then 7.00 parts of sodium polytungstate (trade name: SPT-1, SOMETU.) was added as a specific gravity adjuster to obtain a vehicle.

20.00 parts of a completely colored microcapsule pigment and a vehicle were mixed to obtain an ink composition.

As a result of measuring the specific gravity of the vehicle at 20° C. when water was used as a reference material, the specific gravity was 1.152.

As a result of measuring the specific gravity of the microcapsule pigment at 20° C., the specific gravity was 1.13 to 1.14, and the specific gravity of the vehicle was 1.01 to 1.02 times the specific gravity of the microcapsule pigment.

As a result of measuring the viscosity of the ink composition using the BL type viscometer, the viscosity at 20° C. was 12.20 mPa·s at a rotational speed of 6 rpm, 10.06 mPa·s at a rotational speed of 12 rpm, and 8.73 mPa·s at a rotational speed of 30 rpm.

At 20° C., the surface tension of the ink composition was 35.61 mN/m, and the pH value was 6.92.

Preparation of Filled-In Type Writing Instrument (see FIG. 6)

A filled-in type writing instrument (marking pen) was obtained in the same procedure as in Example 9.

Using the marking pen, a blue letter (handwriting) was formed by writing on a sheet of paper.

The handwriting was blue at room temperature (20° C.), but the handwriting discolored and became colorless when rubbed using the friction member fitted to the cap front part. This state was kept under room temperature. When the sheet of paper was cooled to −20° C. or less, the color was returned to original blue, and the discoloration behavior was reproduced repeatedly.

Comparative Example 1

Preparation of Microcapsule Pigment

According to the preparation of the microcapsule pigment of Example 1, the microcapsule pigment was prepared and isolated.

Preparation of Ink Composition 0.20 parts of pyridine-2-thiol-1-oxide, sodium salt (trade name: sodium omazine 40%, manufactured by Lonza Japan Ltd.) as a preservative, 0.20 parts of 3-iodo-2-propynylbutyl carbamate (trade name: Glycacil 2000, manufactured by Lonza Japan Ltd.) as a preservative, and 76.60 parts of water were mixed to obtain a vehicle.

23.00 parts of a completely colored microcapsule pigment and a vehicle were mixed to obtain an ink composition.

As a result of measuring the specific gravity of the vehicle at 20° C. when water was used as a reference material, the specific gravity was 1.000.

As a result of measuring the specific gravity of the microcapsule pigment at 20° C., the specific gravity was 1.13 to 1.14, and the specific gravity of the vehicle was 1.13 to 1.14 times the specific gravity of the microcapsule pigment.

As a result of measuring the viscosity of the ink composition using the BL type viscometer, the viscosity at 20° C. was 5.70 mPa·s at a rotational speed of 6 rpm, 2.88 mPa·s at a rotational speed of 12 rpm, and 2.06 mPa·s at a rotational speed of 30 rpm.

At 20° C., the surface tension of the ink composition was 42.05 mN/m, and the pH value was 6.11.

Preparation of Filled-In Type Writing Instrument (see FIG. 4)

A filled-in type writing instrument (marking pen) was obtained in the same procedure as in Example 1.

Using the marking pen, a blue letter (handwriting) was formed by writing on a sheet of paper.

The handwriting was blue at room temperature (20° C.) but the handwriting discolored and became colorless when rubbed using the friction member fitted to the rear end portion of the axial barrel. This state was kept under room temperature. When the sheet of paper was cooled to −20° C. or less, the color was returned to original blue, and the discoloration behavior was reproduced repeatedly.

Using the writing instrument obtained in each of the above Examples and Comparative Examples, the following test was conducted.

(Evaluation of Dispersibility of Microcapsule Pigment)

The ink compositions prepared in Examples 1 to 8 and Comparative Example 1 were allowed to stand at room temperature for 24 hours, and the state of dispersion of the microcapsule pigment after the standing was visually observed.

A: The ink composition is uniformly colored. An extremely small amount of the microcapsule pigment is precipitated or floats on the liquid surface.

B: The microcapsule pigment is partially precipitated or floating on the liquid surface of the ink composition. Although the presence of color variable density is confirmed in the ink composition, there is no practical problem.

C: Most part of the microcapsule pigment is precipitated or floating on the liquid surface of the ink composition. The presence of a color variable-density difference in the ink composition is clear, and there is a practical concern.

(Evaluation of Handwriting Color Development and Writability)

A straight line is written on a writing paper (manufactured by Kokuyo Co., Ltd., trade name: Campus Report Pad A4 A Ruled Line) using the writing instruments prepared in Examples 1 to 8 and Comparative Example 1.

Its cap was fitted to the writing instrument used for writing and it was set on a shaker (recipro-shaker manufactured by Taitec Corporation) in an erecting state (the writing front-end was upward). After vibration was imparted at 284 rpm for 5 hours in a vertical direction, a straight line was written on a writing paper, and the color development and writability of the handwriting before and after the test were compared.

Writing was performed on a writing test medium with the above-mentioned filled-in type writing instrument. The color development of the handwriting at that time was visually observed. The following media for the writing test were used.

A: There is no density difference in handwriting as compared to before the test.

B: Although there is a slight density difference in handwriting as compared to before the test, there is no practical problem.

C: There is a density difference in handwriting as compared to before the test. There is a practical concern.

A writing test was performed with the above-mentioned filled-in type writing instrument. The writability at that time was visually observed. The above-mentioned writing paper was used as a medium for the writing test.

A: Occurrence of faint and intermission is the same as before the test.

B: Although some faints and intermissions are likely to occur as compared to before the test, there is no practical problem.

C: Faints and intermissions are likely to occur as compared to before the test. There is a practical concern.

(Evaluation of Writing Performance)

Writing was performed on a writing test medium with the above-mentioned filled-in type writing instrument, and a feel of writing at that time was organoleptically evaluated. The above-mentioned writing paper was used as a medium for the writing test.

A: The feel of writing was smooth.

B: A slightly heavy feel of writing was felt, but was at a practically acceptable level.

C: The feel of writing was heavy and had poor slipperiness.

The test results are shown in Tables 1 and 2 below.

TABLE 1

| Part | Material name | Example | | | | | | | |
|---|---|---|---|---|---|---|---|---|---|
| | | 1 | 2 | 3 | 4 | 5 | 6 | 7 | 8 |
| Evaluation | Dispersibility of the microcapsule pigment | A | A | A | A | A | A | A | A |
| | Handwriting color development | A | A | A | A | A | A | A | A |
| | Writability | A | A | A | B | B | B | B | A |
| | Writing Performance | A | A | A | B | A | A | A | A |

TABLE 2

| Part | Material name | Example | | | | Comparative Example |
|---|---|---|---|---|---|---|
| | | 9 | 10 | 11 | 12 | 1 |
| Evaluation | Dispersibility of the microcapsule pigment | A | A | B | B | C |
| | Handwriting color development | A | A | A | A | C |
| | Writability | A | A | A | A | C |
| | Writing Performance | A | B | B | B | A |

REFERENCE SIGNS LIST t1 Complete coloring temperature of microcapsule pigment of heat-decoloring type
t2 Coloring starting temperature of microcapsule pigment of heat-decoloring type
t3 Decoloring starting temperature of microcapsule pigment of heat-decoloring type
t4 Complete decoloring temperature microcapsule pigment of heat-decoloring type
T1 Complete decoloring temperature of microcapsule pigment of heat color-developing type
T2 Decoloring starting temperature of microcapsule pigment of heat color-developing type
T3 Coloring starting temperature of microcapsule pigment of heat color-developing type
T4 Complete coloring temperature of microcapsule pigment of heat color-developing type
ΔH Hysteresis width
1 Writing instrument
2 Ink occlusion body
3 Pen body
4 Axial barrel
5 Holder
6 Cap
7 Friction member

The invention claimed is:

1. A reversibly thermochromic ink composition comprising:
a reversibly thermochromic microcapsule pigment encapsulating a reversibly thermochromic composition comprising (a) an electron-donating color-developing organic compound, (b) an electron-accepting compound, and (c) a reaction medium to determine an occurrence temperature of a coloring reaction of the component (a) and the component (b); and
a vehicle comprising water and a specific gravity adjuster selected from the group consisting of an oxyacid belonging to Group 6 having an atomic weight of 90 to 185 and a salt thereof,
wherein when water is used as a reference material at 20° C., a specific gravity of the microcapsule pigment is 1.05 to 1.20, a specific gravity of the vehicle is 1.00 to 1.30, and the specific gravity of the vehicle is 0.90 to 1.20 based on the specific gravity of the microcapsule pigment.

2. The ink composition according to claim 1, wherein the content of the specific gravity adjuster is 2% by mass to 20% by mass based on the total mass of the ink composition.

3. The ink composition according to claim 1, wherein the vehicle further comprises a polymeric coagulant.

4. The ink composition according to claim 1, wherein the vehicle further comprises a dispersant.

5. The ink composition according to claim 4, wherein the dispersant is an acrylic polymer having a comb-shaped structure having a carboxyl group in the side chain.

6. The ink composition according to claim 1, wherein the vehicle further comprises an aqueous organic solvent.

7. The ink composition according to claim 6, wherein the aqueous organic solvent is glycerin.

8. The ink composition according to claim 1, wherein the vehicle further comprises a dispersion enhancer.

9. The ink composition according to claim 1, wherein a pH value is 3 to 7.

10. The ink composition according to claim 1, wherein when water is used as the reference material at 20° C., the specific gravity of the microcapsule pigment is 1.05 to 1.15, the specific gravity of the vehicle is 1.00 to 1.30, and the specific gravity of the vehicle is 0.90 to 1.20 based on the specific gravity of the microcapsule pigment.

11. The ink composition according to claim 1, wherein at 20° C., a viscosity at a rotational speed of 6 rpm measured by a BL type viscometer is 3 to 25 mPa·s, a viscosity at a rotational speed of 12 rpm is 2 to 20 mPa·s, and a viscosity at a rotational speed of 30 rpm is 1 to 20 mPa·s.

12. The ink composition according to claim 1, which is a reversibly thermochromic ink composition for a writing instrument.

13. A writing instrument storing the ink composition according to claim 1.

14. The writing instrument according to claim 13, wherein the writing instrument is a marking pen.

15. The writing instrument according to claim 13, further comprising a friction member.

\* \* \* \* \*